United States Patent
Wang et al.

(10) Patent No.: US 12,452,533 B2
(45) Date of Patent: Oct. 21, 2025

(54) OPTICAL COMPONENT DRIVING MECHANISM

(71) Applicant: TDK TAIWAN CORP., Taoyuan (TW)

(72) Inventors: Chao-Hsi Wang, Taoyuan (TW);
Chao-Chang Hu, Taoyuan (TW);
Chih-Wei Weng, Taoyuan (TW);
Xuan-Huan Su, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 685 days.

(21) Appl. No.: 17/554,385

(22) Filed: Dec. 17, 2021

(65) Prior Publication Data
US 2022/0197010 A1 Jun. 23, 2022

Related U.S. Application Data

(60) Provisional application No. 63/127,746, filed on Dec. 18, 2020.

(51) Int. Cl.
*G02B 7/09* (2021.01)
*G02B 7/04* (2021.01)
(Continued)

(52) U.S. Cl.
CPC ............ *H04N 23/687* (2023.01); *G02B 7/04* (2013.01); *G02B 7/09* (2013.01); *G02B 13/0015* (2013.01);
(Continued)

(58) Field of Classification Search
CPC ........ G03B 11/043; G03B 5/00; G03B 13/36; H04N 23/55; H04N 23/54; H04N 23/57;
(Continued)

(56) References Cited

U.S. PATENT DOCUMENTS

2004/0258405 A1* 12/2004 Shiratori ................. G03B 9/14
396/458
2010/0202770 A1* 8/2010 Kihara ..................... G03B 9/14
396/493
(Continued)

FOREIGN PATENT DOCUMENTS

CN 211878277 U 11/2020

OTHER PUBLICATIONS

CN Office Action issued on Jun. 12, 2025 for the corresponding Application No. 202111550785.6.

*Primary Examiner* — Ricky L Mack
*Assistant Examiner* — Elizabeth M Hall
(74) *Attorney, Agent, or Firm* — MUNCY, GEISSLER, OLDS & LOWE, P.C.

(57) ABSTRACT

An optical driving mechanism is provided, including a first movable portion, a fixed portion, a first driving assembly, and a limiting assembly. The first movable portion is connected to the optical component. The fixed portion has an opening. The first movable portion is movable relative to the fixed portion. The first driving assembly is configured for driving the first movable portion to perform a first movement relative to the fixed portion. The limiting assembly is configured for limiting the range of motion of the first movable portion. The optical component overlaps the opening when the first movable portion is located in the first position.

17 Claims, 20 Drawing Sheets

(51) Int. Cl.
*G02B 13/00* (2006.01)
*G02B 26/00* (2006.01)
*G02B 26/08* (2006.01)
*G02B 27/64* (2006.01)
*G03B 5/00* (2021.01)
*G03B 13/36* (2021.01)
*G06F 3/01* (2006.01)
*H04N 23/54* (2023.01)
*H04N 23/57* (2023.01)
*H04N 23/68* (2023.01)
*H10N 30/00* (2023.01)
*H10N 30/80* (2023.01)

(52) U.S. Cl.
CPC ......... *G02B 26/00* (2013.01); *G02B 26/0875* (2013.01); *G02B 27/64* (2013.01); *G02B 27/646* (2013.01); *G06F 3/016* (2013.01); *H04N 23/54* (2023.01); *H04N 23/57* (2023.01); *H10N 30/101* (2024.05); *H10N 30/802* (2023.02)

(58) Field of Classification Search
CPC ...... G02B 26/00; G02B 13/0015; G02B 7/04; G02B 7/09; G02B 26/0875; G02B 27/64; G02B 27/646; G06F 3/016; H10N 30/101; H10N 30/802
USPC ...................................................... 359/221.2
See application file for complete search history.

(56) References Cited

U.S. PATENT DOCUMENTS

| | | | |
|---|---|---|---|
| 2013/0100304 A1* | 4/2013 | Wade | G02B 27/646 |
| | | | 348/208.4 |
| 2013/0135488 A1* | 5/2013 | Yokota | H04N 23/681 |
| | | | 348/208.11 |
| 2019/0227256 A1* | 7/2019 | Kuo | G02B 27/0068 |
| 2019/0361323 A1* | 11/2019 | Jerby | G02B 27/646 |
| 2020/0249415 A1* | 8/2020 | Wang | G03B 5/00 |
| 2020/0393667 A1* | 12/2020 | Wang | H02N 2/043 |

* cited by examiner

OPTICAL COMPONENT DRIVING MECHANISM

CROSS REFERENCE TO RELATED APPLICATIONS

This application claims the benefit of U.S. Provisional Application No. 63/127,746, filed 18 Dec. 2020, the entirety of which is incorporated by reference herein.

BACKGROUND OF THE INVENTION

Field of the Invention

The present disclosure relates to an optical component driving mechanism, and more particularly to an optical component driving mechanism with a limiting assembly.

Description of the Related Art

As technology has developed, it has become more common to include image-capturing and video-recording functions into many types of modern electronic devices, such as notebooks, smartphones or digital cameras. These electronic devices are used more and more often, and new models have been developed that are convenient, thin, and lightweight, offering more choices for consumers.

Electronic devices that have image-capturing or video-recording functions normally include a driving mechanism to drive an optical component to move. Light may pass through the optical component and may form an image on an optical sensor. However, the trend in modern mobile devices is to have a higher durability and a higher privacy. As a result, the present disclosure provides a driving mechanism different from the prior ones, to increase its stability and also improve information security.

BRIEF SUMMARY OF THE INVENTION

The present invention provides an optical component driving mechanism, including a first movable portion, a fixed portion, a first driving assembly, and a limiting assembly. The first movable portion is connected to an optical component. The fixed portion has an opening. The first movable portion is movable relative to the fixed portion. The first driving assembly is configured to drive the first movable portion to perform a first movement relative to the fixed portion. The limiting assembly limits the range of motion of the first movable portion. The optical component overlaps the opening when the first movable portion is located in a first position.

According to some embodiments of the present disclosure, the limiting assembly includes a first locking structure, a second movable portion, and a second driving assembly. The first locking structure corresponds to a second locking structure, and the first locking structure limits the first movable portion in the first position when the first driving assembly drives the first movable portion to move. The second movable portion is connected to the first locking structure or the second locking structure. The second driving assembly is configured to drive the second movable portion to perform a second movement relative to the fixed portion. The first movement is different from the second movement. The first locking structure has an elongated structure extending along the long axis, and the first locking structure and the second locking structure are fixedly disposed on the second movable portion and the first movable portion respectively.

According to some embodiments of the present disclosure, the second movement is rotation with a rotational axis as the axle center, and the rotational axis is parallel to the first axis. The first movement is movement along a second axis, wherein the second axis is perpendicular to the first axis.

According to some embodiments of the present disclosure, the first locking structure includes a body, a first locking portion, a first guiding portion, a second guiding portion, a second locking portion, a third guiding portion, and a fourth guiding portion. The body has an elongated structure extending along the long axis. The first locking portion has a curved structure, located at a first end of the body, and corresponding to a first abutting portion of the second locking structure. The first abutting portion has a curved structure. The first guiding portion has a planar structure, and the first guiding portion is adjacent to the first locking portion. The first guiding portion forms a discontinuous surface with the first locking portion. The first guiding portion guides the second locking structure to move relative to the first locking structure when the first locking structure is movable relative to the second locking structure. The second guiding portion has a planar structure, and the second guiding portion is adjacent to the first locking portion. The second guiding portion forms a discontinuous surface with the first locking portion. The first locking portion is located between the first guiding portion and the second guiding portion. The second guiding portion guides the second locking structure to move relative to the first locking structure when the first locking structure is movable relative to the second locking structure. The second locking portion has a curved structure, located at the second end of the body, and corresponding to the second abutting portion of the second locking structure. The second abutting portion has a curved structure. The third guiding portion has a planar structure, and the third guiding portion is adjacent to the second locking portion. The third guiding portion forms a discontinuous surface with the second locking portion. The third guiding portion guides the second locking structure to move relative to the first locking structure when the first locking structure is movable relative to the second locking structure. The fourth guiding portion has a planar structure, and the fourth guiding portion is adjacent to the second locking portion. The fourth guiding portion forms a discontinuous surface with the second locking portion. The second locking portion is located between the third guiding portion and the fourth guiding portion. The fourth guiding portion guides the second locking structure to move relative to the first locking structure when the first locking structure is movable relative to the second locking structure.

According to some embodiments of the present disclosure, the included angle between the first guiding portion and the second guiding portion is less than 90 degrees when viewed along the first axis.

According to some embodiments of the present disclosure, the included angle between the first guiding portion and the second guiding portion is greater than 90 degrees when viewed along the first axis.

According to some embodiments of the present disclosure, the included angle between the first guiding portion and the long axis is less than 45 degrees when viewed along the first axis. The center of the first guiding portion and the second guiding portion is located on the long axis, and the first guiding portion and the second guiding portion are not parallel when viewed along the first axis.

According to some embodiments of the present disclosure, the second locking structure has an accommodating structure. The accommodating structure corresponds to the body. The accommodating structure has an elongated structure.

According to some embodiments of the present disclosure, the limiting assembly further includes a first stopper structure corresponding to a second stopper structure, limiting the range of motion of the second movable portion. The first stopper structure has an elongated structure. The extension direction of the first stopper structure is not parallel to the long axis. The first stopper structure does not overlap the first locking structure when viewed along any direction perpendicular to the first axis. The first stopper structure comprises a first stopper surface and a second stopper surface. The second stopper structure includes a third stopper surface and a fourth stopper surface. The first stopper surface is parallel to the second stopper surface. The first stopper surface and the second stopper surface face in opposite directions. The third stopper surface and the fourth stopper surface are not parallel.

According to some embodiments of the present disclosure, the long axis is parallel to the extension direction of the accommodating structure when the first locking structure is in an open position relative to the second locking structure. The long axis is parallel to the second axis when the first locking structure is in the open position relative to the second locking structure. On a third axis (which is perpendicular to both the first axis and the extension direction of the accommodating structure), the maximum size of the first locking structure is smaller than the maximum size of the accommodating structure when the first locking structure is in the open position relative to the second locking structure. The first axis, the second axis, and the third axis are perpendicular to each other.

According to some embodiments of the present disclosure, the difference between the maximum size of the first locking structure and the maximum size of the accommodating structure is at least 0.16 mm on the third axis.

According to some embodiments of the present disclosure, the first movable portion has an elongated structure and extends along the second axis. The first abutting portion is located on a first protrusion of the first movable portion. The second abutting portion is located on a second protrusion of the first movable portion. The structure of the first protrusion and the structure of the second protrusion have point symmetry when viewed along the first axis. The arrangement direction of the first abutting portion and the second abutting portion is not parallel to the second axis when viewed along the first axis. The arrangement direction of the first abutting portion and the second abutting portion is not parallel to the third axis when viewed along the first axis. The first abutting portion and the second abutting portion are located at the same end of the first movable portion when viewed along the first axis.

According to some embodiments of the present disclosure, the first driving assembly includes a first magnetic component, a first coil, and a first magnetically permeable component. The first coil corresponds to the first magnetic component. The first magnetically permeable component has a magnetically permeable material and an elongated structure. The first coil is wound around the first magnetically permeable component.

According to some embodiments of the present disclosure, the second driving assembly includes a second magnetic component, a second coil, and a second magnetically permeable component. The second magnetic component and the second movable portion have an integrally formed structure. The second coil corresponds to the second magnetic component. The second magnetically permeable component has a magnetically permeable material and an elongated structure. The second coil is wound around the second magnetically permeable component.

According to some embodiments of the present disclosure, the winding axis of the first coil is not parallel to the winding axis of the second coil. The extension direction of the first magnetically permeable component is not parallel to the extension direction of the second magnetically permeable component. The arrangement direction of the magnetic poles of the first magnetic component is perpendicular to the arrangement direction of the magnetic poles of the second magnetic component.

According to some embodiments of the present disclosure, when the second coil does not receive any signal, the second driving assembly generates a predetermined force to move the first stopper structure toward the third stopper surface. When the first movable portion receives a first impact force, the first movable portion moves along a first direction, the first locking portion contacts the first abutting portion, and the first movable portion generates a first torque to the second movable portion. As a result, the first stopper structure moves toward the third stopper surface, and the first stopper structure is in direct contact with the third stopper surface. When the first movable portion receives a second impact force, the first movable portion moves along a second direction, and the second locking portion contacts the second abutting portion, and the first movable portion generates a second torque to the second movable portion. As a result, the first stopper structure moves toward the third stopper surface, and the first stopper structure is in direct contact with the third stopper surface. The first direction and the second direction are in opposite directions.

According to some embodiments of the present disclosure, the optical component driving mechanism has a polygonal structure. The optical component driving mechanism has an elongated structure extending along the second axis when viewed along the first axis. The optical component driving mechanism further includes a first side, a second side, and a third side. The second side is perpendicular to the first side. The length of the first side is smaller than the length of the second side. The second side extends along the second axis. The third side is parallel to the first side. The shortest distance between the opening and the first side is different from the shortest distance between the opening and the third side.

According to some embodiments of the present disclosure, the fixed portion further includes a base. The base is made of a non-metallic material. The base has a first accommodating space and a second accommodating space. The first accommodating space accommodates the first driving assembly. The second accommodating space accommodates the second driving assembly. The first coil is placed in the first accommodating space from a third direction. The first magnetic component is placed in the first accommodating space from a fourth direction. The second coil is placed in the second accommodating space from the third direction. The second magnetic component is placed in the second accommodating space from the fourth direction. The third direction and the fourth direction are parallel to the first axis. The third direction and the fourth direction are in opposite directions.

According to some embodiments of the present disclosure, the opening corresponds to a light traveling along an optical axis. The optical axis is parallel to the first axis. The shortest distance between the opening and the first side is smaller than the shortest distance between the opening and the third side. The first driving assembly and the second driving assembly are arranged along the second axis. The second driving assembly is located between the opening and the first driving assembly when viewed along the first axis.

According to some embodiments of the present disclosure, the optical component driving mechanism further includes a first terminal, a second terminal, and a stopper component. The first driving assembly is electrically connected to an external circuit via the first terminal. The second driving assembly is electrically connected to the external circuit via the second terminal. The stopper component limits the range of motion of the second magnetic component. The stopper component is made of a metal material. The stopper component has a plate-like structure perpendicular to the first axis. The first driving assembly is located between the first terminal and the second terminal when viewed along the first axis, the stopper component and the second magnetic component at least partially overlap when viewed along the first axis.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

In order to make the purpose, features, and advantages of the present disclosure more obvious and understandable, the following embodiments are specially cited, and the accompanying drawings are used for detailed description. Among them, the configuration of each element in the embodiment is for illustrative purposes, and is not intended to limit the disclosure. In addition, part of the repetition of the reference numbers in the embodiments is for simplifying the description, and does not mean the relevance between different embodiments. The directional terms mentioned in the following embodiments, for example: up, down, left, right, front or back, etc., are only directions for referring to the attached drawings. Therefore, the directional terms used are used to illustrate and not to limit the disclosure.

In addition, relative terms such as "lower" or "bottom" and "higher" or "top" may be used in the embodiments to describe the relative relationship between one element of the illustration and another element. It can be understood that if the illustrated device is turned upside down, the elements described on the "lower" side will become the elements on the "higher" side.

The optical component driving mechanism of the embodiment of the present invention is described below. However, it can be easily understood that the embodiments of the present invention provide many suitable inventive concepts and can be implemented in a wide variety of specific backgrounds. The specific embodiments disclosed are only used to illustrate the use of the present invention in a specific method, and are not used to limit the scope of the present invention. Unless otherwise defined, all terms used here (including technical and scientific terms) have the same meanings commonly understood by the general artisans to whom the disclosures in this article belong. It is understandable that these terms, such as the terms defined in commonly used dictionaries should be interpreted as having a meaning consistent with the relevant technology and the background or context of this disclosure, and should not be interpreted in an idealized or excessively formal way, unless specifically defined herein.

Figure 1:
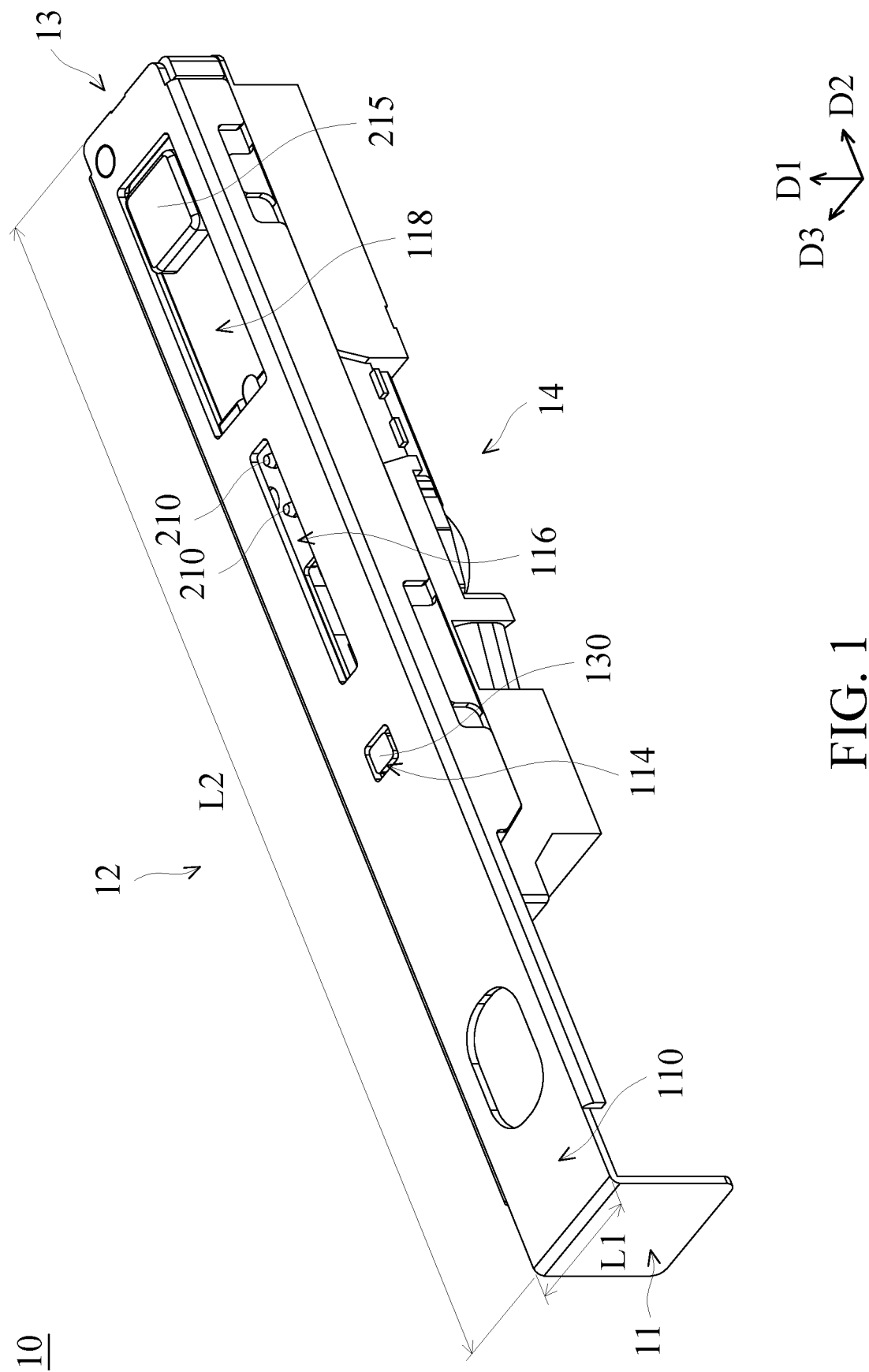
FIG. 1 is a perspective view of an optical component driving mechanism according to some embodiments of the disclosure.

Please refer to FIG. 1. FIG. 1 is a perspective view of an optical component driving mechanism 10 according to some embodiments of the present disclosure. The optical component driving mechanism 10 has a polygonal structure. In FIG. 1, a first side 11, a second side 12, a third side 13, and a fourth side 14 of the optical component driving mechanism 10 can be seen.

The first side 11 is perpendicular to the second side 12. The length L1 of the first side 11 is smaller than the length L2 of the second side 12. The first side 11 is parallel to the third side 13. The second side 12 is parallel to the fourth side 14. When viewed along a first axis D1, the optical component driving mechanism 10 has an elongated structure that extends along a second axis D2. The first axis D1 is perpendicular to the second axis D2.

Figure 2:
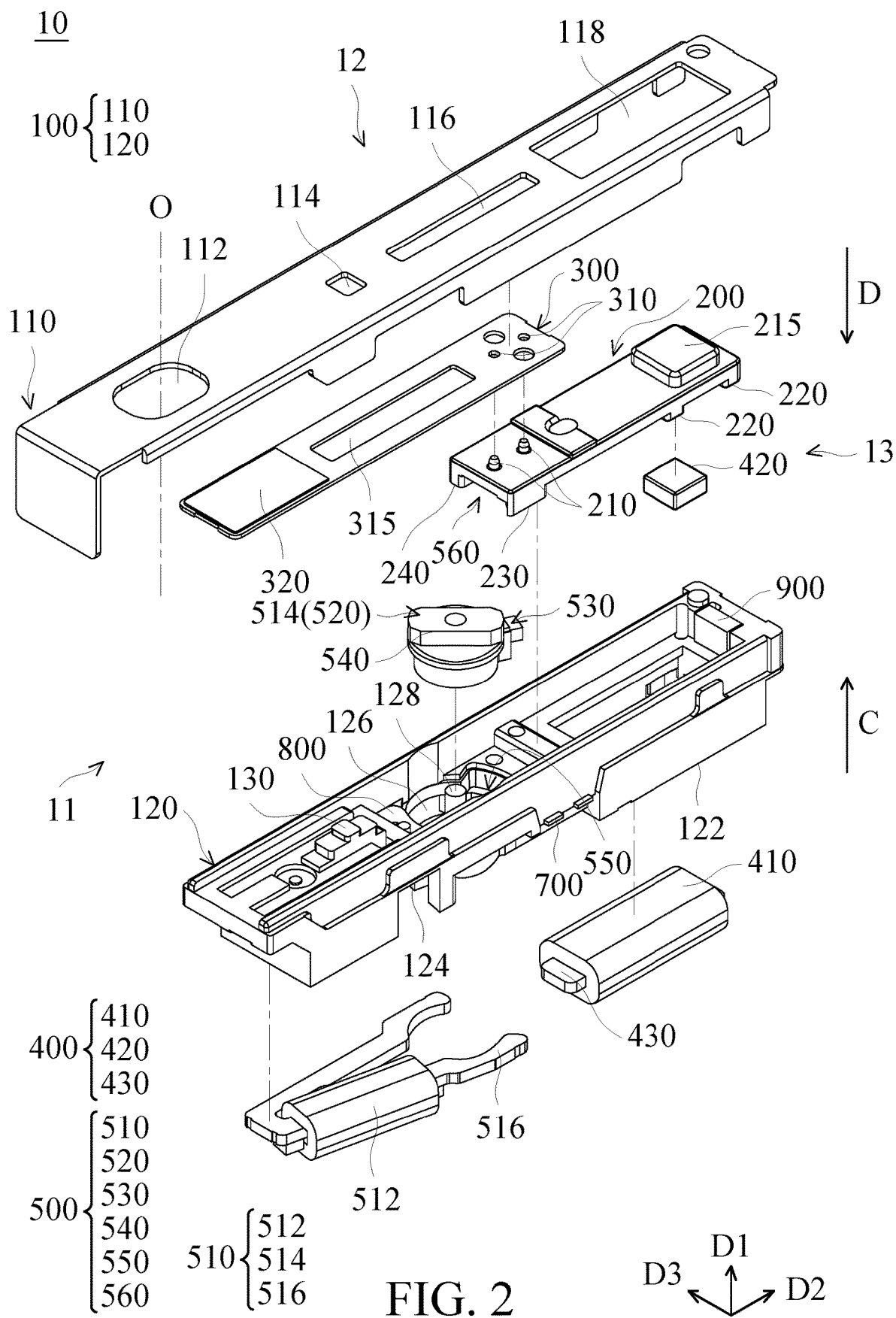
FIG. 2 is an exploded view of the optical component driving mechanism according to some embodiments of the disclosure.

Please refer to FIG. 2. FIG. 2 is an exploded view of the optical component driving mechanism 10 according to some embodiments of the present disclosure. The optical component driving mechanism 10 is configured to drive an optical component 300. The optical component driving mechanism 10 includes a fixed portion 100, a first movable portion 200, a first driving assembly 400, a limiting assembly 500, a first terminal 600 (FIG. 3A), a second terminal 700, a stopper component 800, and a buffer component 900.

The fixed portion 100 includes a housing 110 and a base 120. The housing 110 includes openings 112, 114, 116, and 118. The opening 112 corresponds to a light traveling along an optical axis O, and the optical axis O is parallel to the first axis D1. The shortest distance between the opening 112 and the first side 11 is smaller than the shortest distance between the opening 112 and the third side 13. The openings 112, 114, 116, and 118 are arranged along the second axis D2.

The base 120 is made of a non-metallic material. The base 120 includes a first accommodating space 122, a second accommodating space 124, an accommodating space 126, a protruding post 128, and a bump 130. The first accommodating space 122 and the second accommodating space 124 are not completely shown in FIG. 2. The details are described in relation to FIG. 5.

The first movable portion 200 has an elongated structure and extends along the second axis D2. The first movable portion 200 includes two connecting parts 210, a bump 215, four bumps 220, a first protrusion 230, a second protrusion 240, and a groove 250. The optical component 300 includes two holes 310, an opening 315, and a shielding portion 320.

The connecting parts 210 connect the first movable portion 200 to the optical component 300 by passing through the holes 310. The bump 130 may pass through the opening 315 of the optical component 300, and may be exposed at the opening 114 of the housing 110 as shown in FIG. 1. The connecting parts 210 are exposed at the opening 116 of the housing 110 as shown in FIG. 1. The bump 215 is exposed at the opening 118 of the housing 110 as shown in FIG. 1.

Figure 9A:
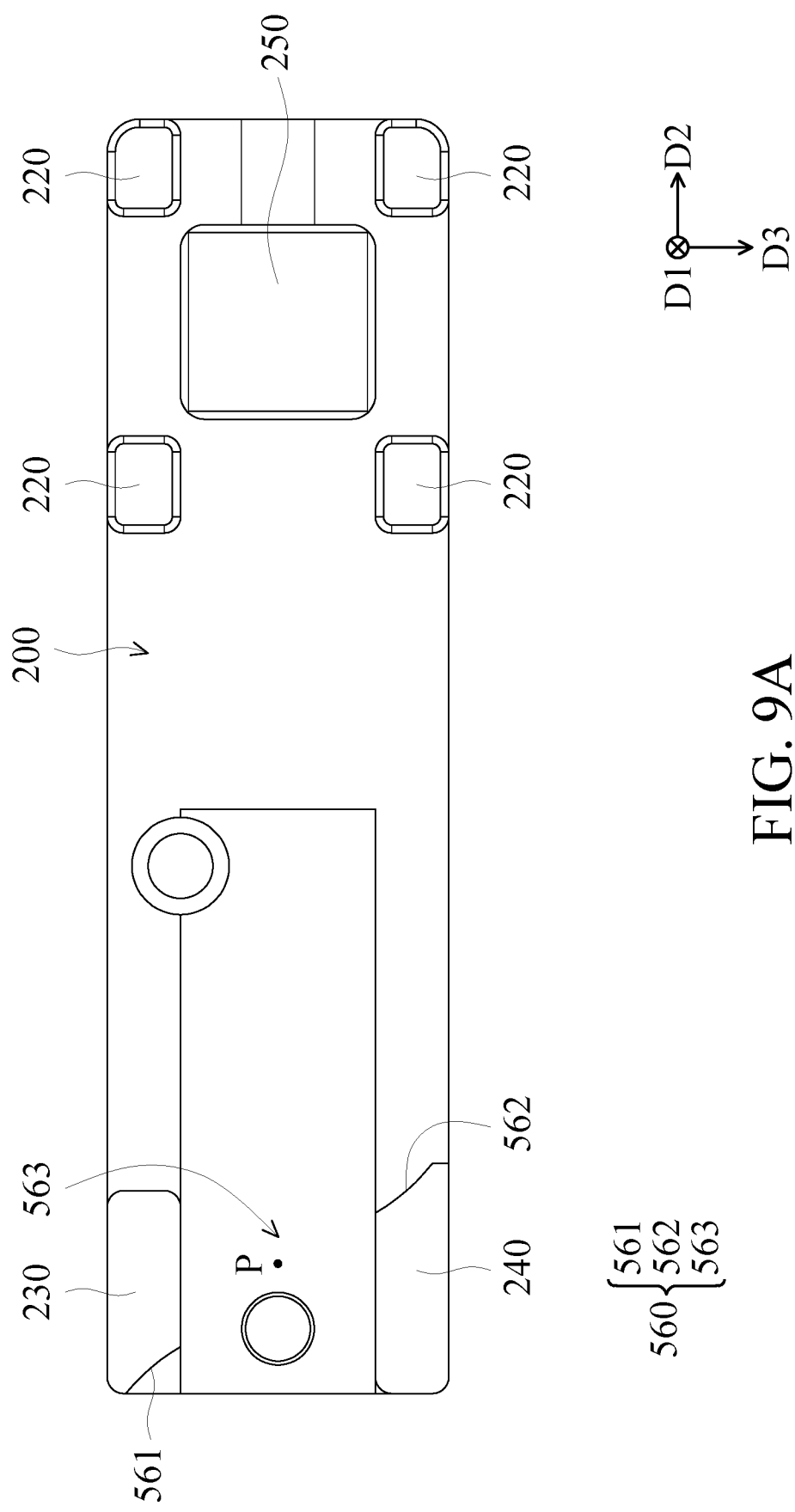
FIG. 9A is a bottom view of the first movable portion according to some embodiments of the disclosure.
Figure 9B:
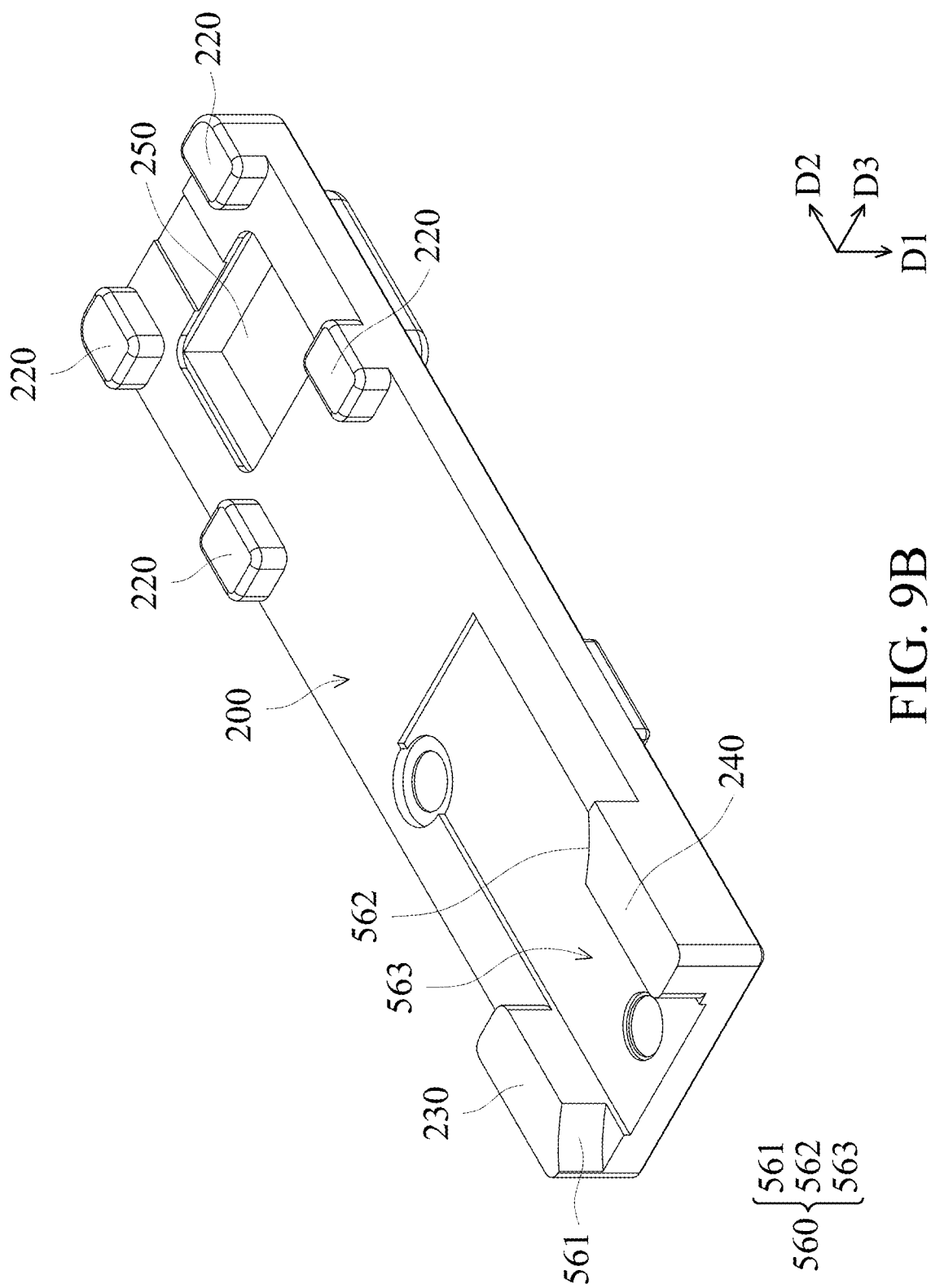
FIG. 9B is a perspective view of the first movable portion according to some embodiments of the disclosure.
Figure 9C:
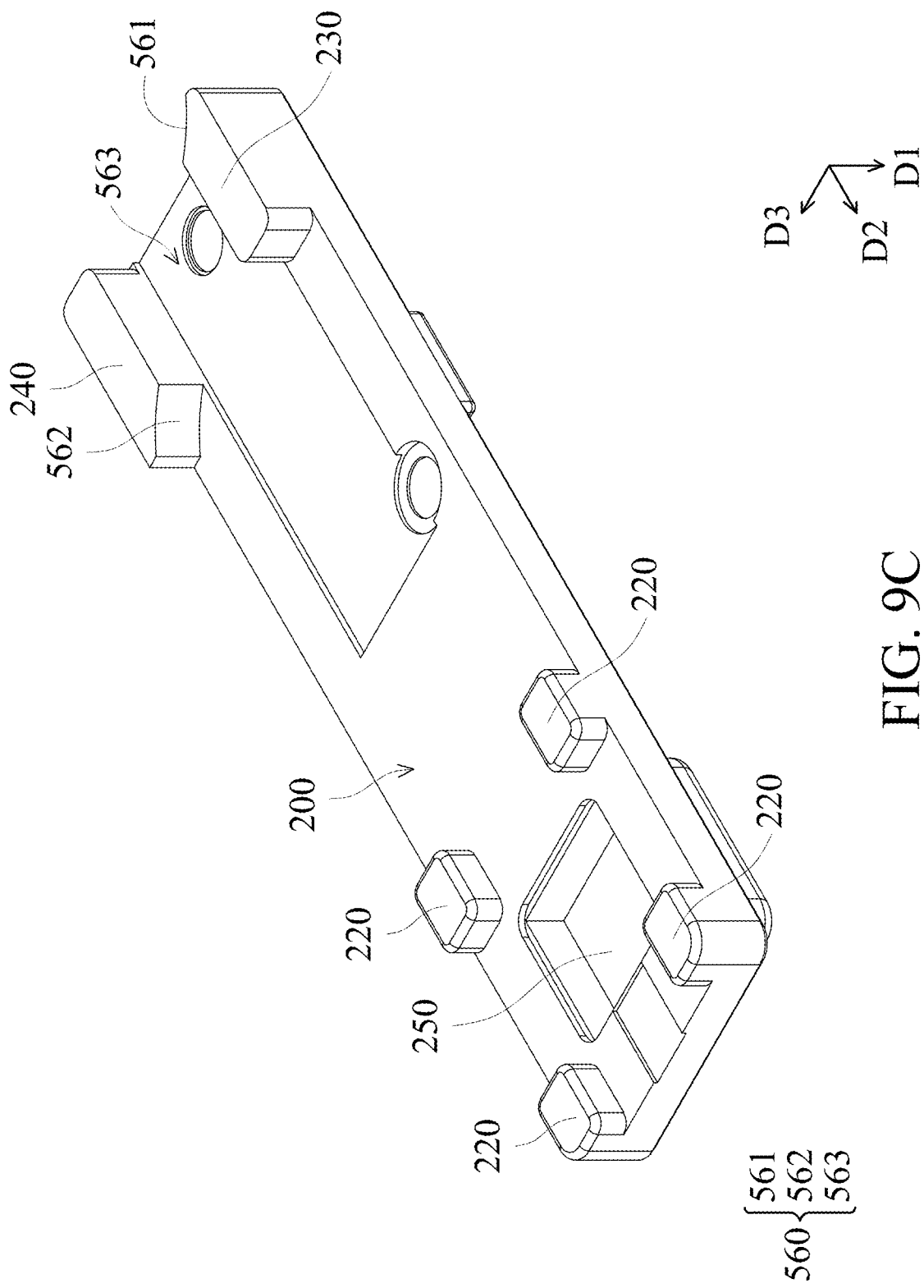
FIG. 9C is a perspective view of the first movable portion according to some embodiments of the disclosure.

In the view of FIG. 2, only part of the bump 220, the first protrusion 230, and the second protrusion 240 can be seen, wherein the groove 250 cannot be seen, the details of which are described in relation to FIGS. 9A to 9C. The shielding portion 320 may be a light-shielding sheet, a blade, a filter, a light-reduction mirror, a polarizer, etc., for example, a SOMA light-shielding sheet.

The first driving assembly 400 is configured to drive the first movable portion 200 and the optical component 300 connected to the first movable portion 200 to perform a first movement relative to the fixed portion 100. The first movement is movement along the second axis D2.

The first driving assembly 400 includes a first coil 410, a first magnetic component 420, and a first magnetically permeable component 430. The first coil 410 corresponds to the first magnetic component 420. The first coil 410 is wound around the first magnetically permeable component 430. In this embodiment, a pair of magnetic poles (N pole and S pole) of the first magnetic component 420 is arranged along the direction of the first axis D1. The first magnetically permeable component 430 is made of a magnetically permeable material, for example, a material with high magnetic permeability such as a ferromagnetic material. The first magnetically permeable component 430 is used to concentrate the magnetic force generated between the first magnetic component 420 and the first coil 410.

The limiting assembly 500 is used to limit the range of motion of the first movable portion 200. The limiting assembly 500 may keep the optical component 300 in a certain position range even when the optical component driving mechanism 10 is subjected to an impact force. This feature is described in relation to FIGS. 10A to 10E. The limiting assembly 500 includes a second driving assembly 510, a second movable portion 520, a first stopper structure 530, a first locking structure 540, a second stopper structure 550, and a second locking structure 560.

The second driving assembly 510 includes a second coil 512, a second magnetic component 514, and a second magnetically permeable component 516. The second coil 512 corresponds to the second magnetic component 514. The second coil 512 is wound around the second magnetically permeable component 516. The second magnetically permeable component 516 has an elongated structure. The second magnetically permeable component 516 is made of a magnetically permeable material, for example, a material with high magnetic permeability such as a ferromagnetic material. The second magnetically permeable component 516 is used to concentrate the magnetic force generated between the second magnetic component 514 and the second coil 512.

The second driving assembly 510 is used to drive the second movable portion 520, so the second movable portion 520 may perform a second movement relative to the fixed portion 100. The second movement is rotation with a rotational axis (the protruding post 128) as the axle center, and the rotational axis is parallel to the first axis D1. In this embodiment, the second magnetic component 514 and the second movable portion 520 are formed integrally as a single structure, which aids in the miniaturization of the mechanism.

In other words, the second magnetic component 514 and the second movable portion 520 in this embodiment do not need to be connected by bonding, welding, or the like. It should be understood that in different embodiments, the second magnetic component 514 and the second movable portion 520 may also be two independent structures.

The first driving assembly 400 and the second driving assembly 510 are arranged along the second axis D2. The second driving assembly 510 is located between the opening 112 and the first driving assembly 400 when viewed along the first axis D1. The first stopper structure 530 and the second stopper structure 550 are not completely shown in FIG. 2. The details are described in relation to FIGS. 8A to 8B. The first locking structure 540 and the second locking structure 560 are not completely shown in FIG. 2. The details are described in relation to FIGS. 10A to 10E.

The first terminal 600 and the second terminal 700 are embedded in the base 120, and are not completely exposed in FIG. 2. The details are described in relation to FIG. 5. The stopper component 800 is disposed on the base 120. The details are described in relation to FIG. 11. When the first movable portion 200 contacts the buffer component 900, the shielding portion 320 does not overlap the opening 112 in the direction of the first axis D1.

The first movable portion 200, the optical component 300, the first driving assembly 400, the limiting assembly 500, the first terminal 600, the second terminal 700 (FIG. 5), the stopper component 800, and the buffer component 900 are all disposed in the base 120.

Figure 3A:
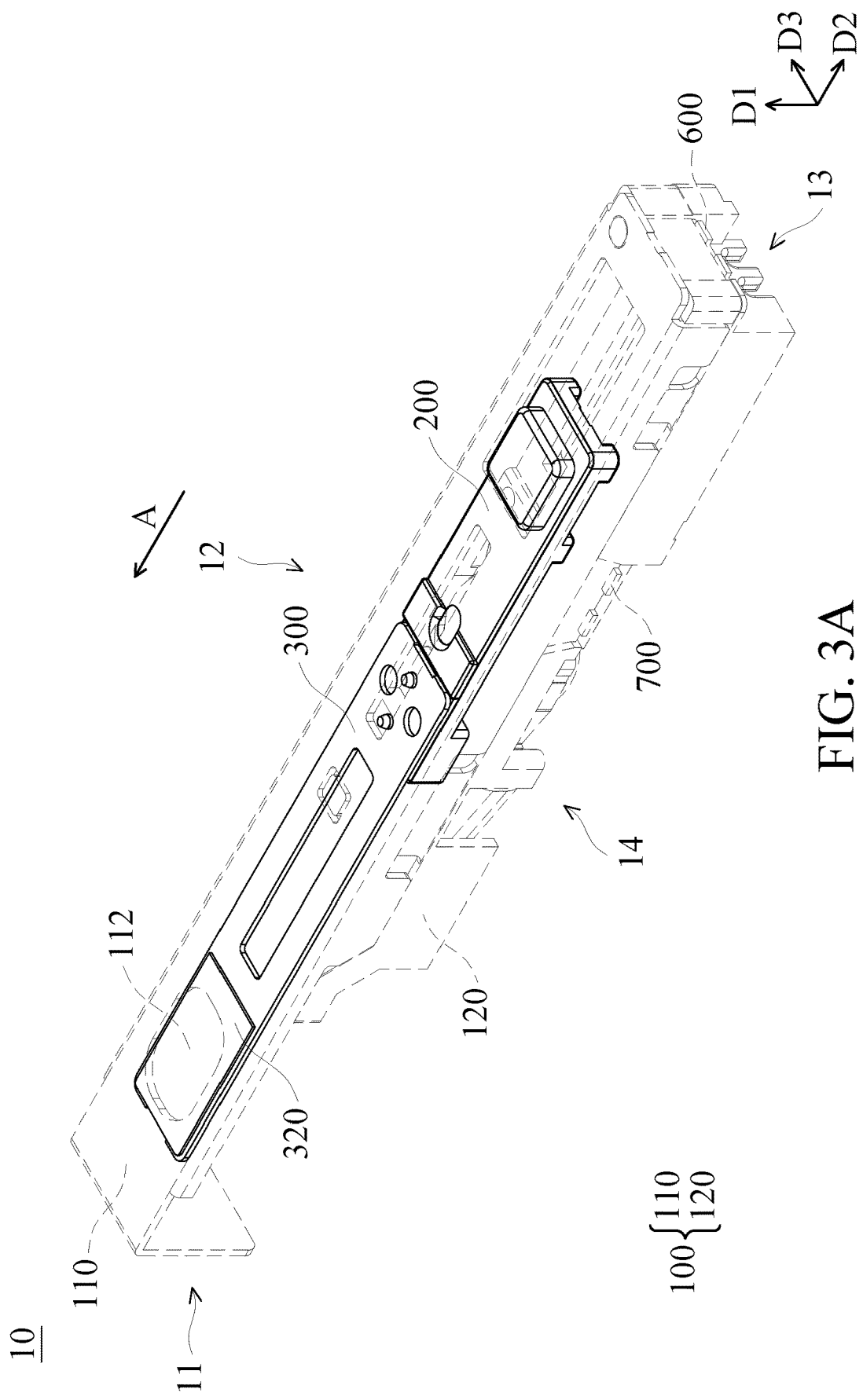
FIG. 3A is a perspective view of the first movable portion and the optical component in a first position relative to the fixed portion according to some embodiments of the disclosure, wherein other components of the optical component driving mechanism are shown in dashed lines.

FIG. 3A shows a perspective view of the first movable portion 200 and the optical component 300 in a first position relative to the fixed portion 100, wherein other components of the optical component driving mechanism 10 are shown in dashed lines.

The first movable portion 200 may be driven by the first driving assembly 400 (FIG. 2) to drive the optical component 300 to move along a first direction A to the first position. When the first movable portion 200 and the optical component 300 move to the first position close to the first side 11, the opening 112 and the shielding portion 320 overlap in the direction of the first axis D1.

Figure 3B:
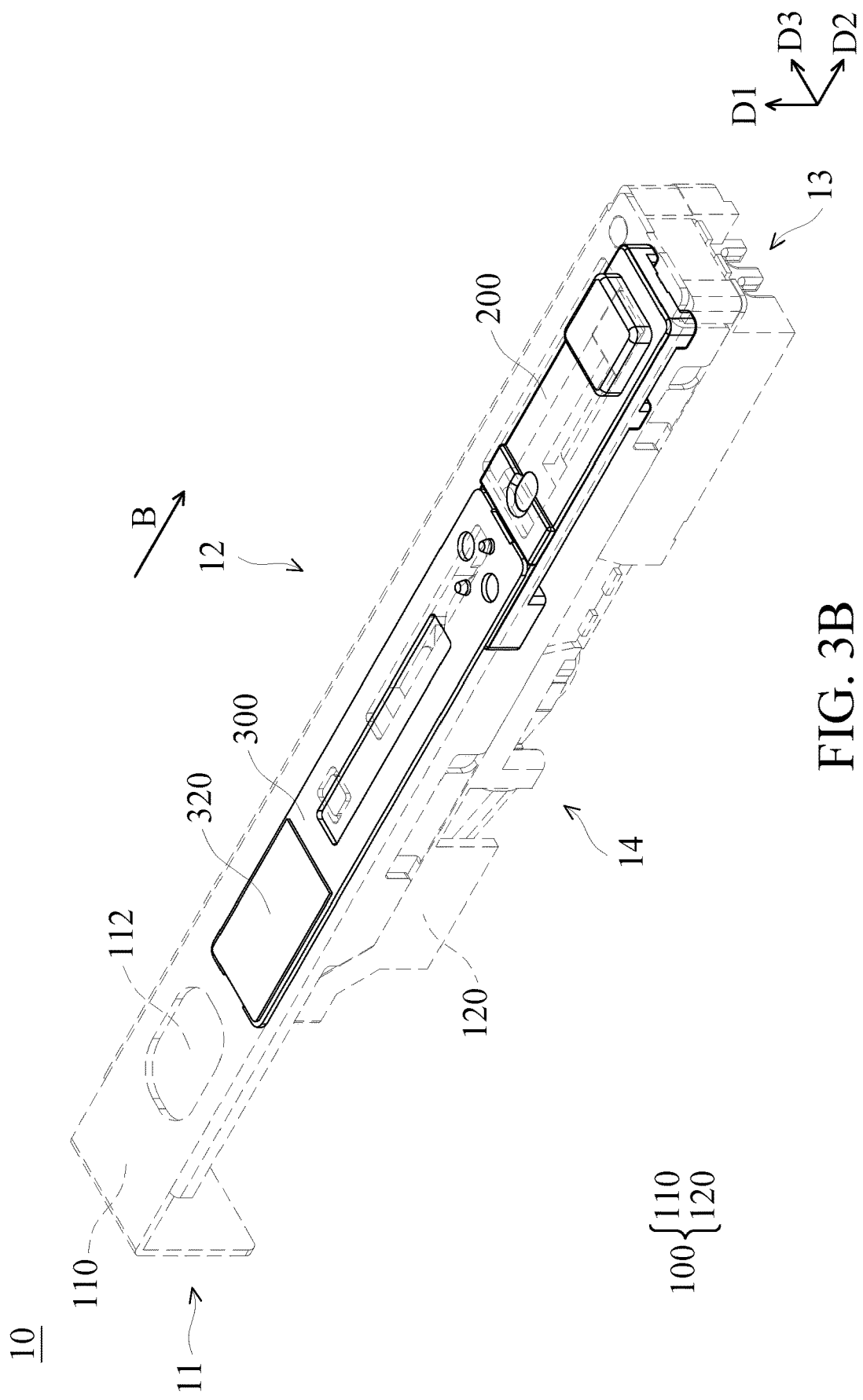
FIG. 3B is a perspective view of the first movable portion and the optical component in a second position relative to the fixed portion according to some embodiments of the present disclosure, wherein other components of the optical component driving mechanism are shown in dashed lines.

FIG. 3B shows a perspective view of the first movable portion 200 and the optical component 300 in a second position relative to the fixed portion 100, wherein other components of the optical component driving mechanism 10 are shown in dashed lines.

The first movable portion 200 may be driven by the first driving assembly 400 (FIG. 2) to drive the optical component 300 to move along a second direction B to the second position. When the first movable portion 200 and the optical component 300 move to the second position close to the third side 13, the first movable portion 200 contacts the buffer component 900 (FIG. 2).

Figure 4:
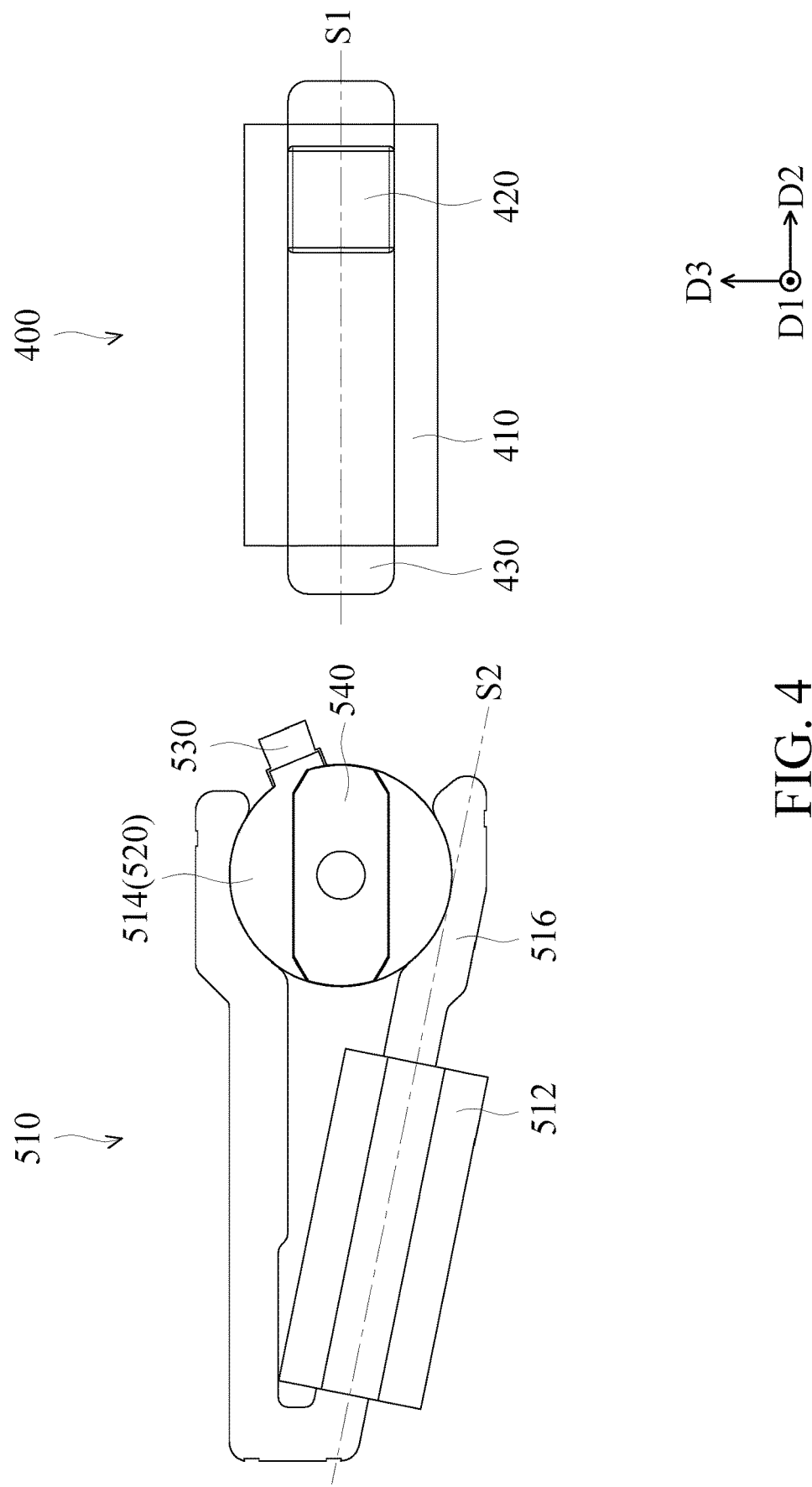
FIG. 4 is a top view of the first driving assembly and the second driving assembly according to some embodiments of the disclosure.

FIG. 4 shows a top view of the first driving assembly 400 and the second driving assembly 510. As shown in FIG. 4, the axis S1 (winding axis) wound around by the first coil 410 is not parallel to the axis S2 (winding axis) wound around by the second coil 512. The extension direction of the first magnetically permeable component 430 wound by the first coil 410 is not parallel to the extension direction of the second magnetically permeable component 516 wound by the second coil 512. The arranged direction of the magnetic poles of the first magnetic component 420 is perpendicular to the arranged direction of the magnetic poles of the second magnetic component 514.

Figure 5:
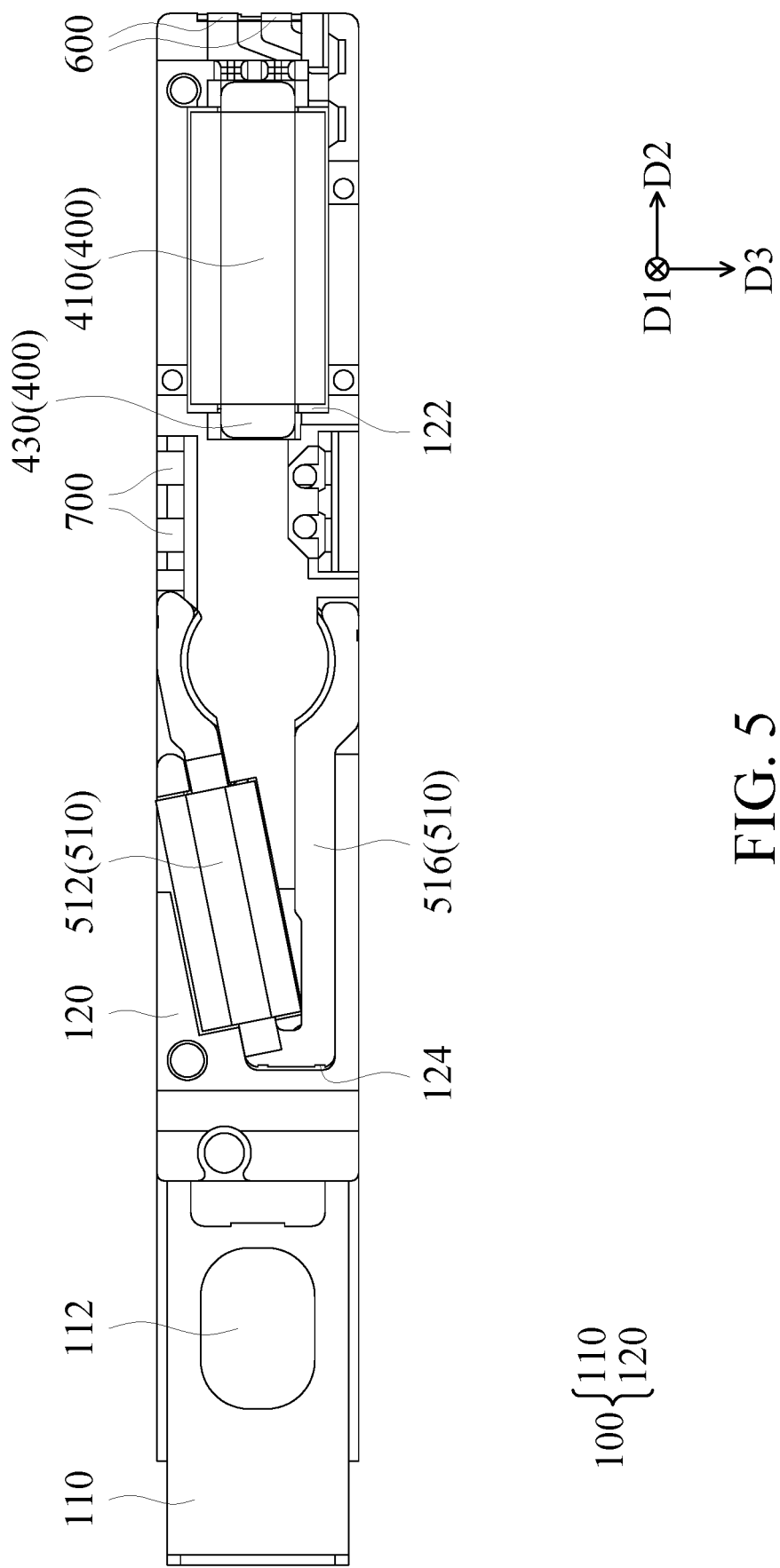
FIG. 5 is a bottom view of the optical component driving mechanism according to some embodiments of the disclosure.

FIG. 5 shows a bottom view of the optical component driving mechanism 10. In FIG. 5, the first accommodating space 122 for accommodating the first driving assembly 400, the second accommodating space 124 for accommodating the second driving assembly 510, the first terminal 600, and the second terminal 700 can be seen.

The first driving assembly 400 is electrically connected to an external circuit (not shown) through the first terminal 600, and the second driving assembly 510 is electrically connected to the external circuit through the second terminal 700. When viewed along the first axis D1, the first driving assembly 400 is located between the first terminal 600 and the second terminal 700.

Referring to FIG. 2 and FIG. 5 together, the first coil 410 is placed in the first accommodating space 122 from a third direction C. The first magnetic component 420 is placed in the first accommodating space 122 from a fourth direction D. The second coil 512 is placed in the second accommodating space 124 from the third direction C. The second magnetic component 514 is placed in the second accommodating space 124 from the fourth direction D. The third direction C and the fourth direction D are in opposite directions. The third direction C and the fourth direction D are parallel to the first axis D1.

Figure 6A:
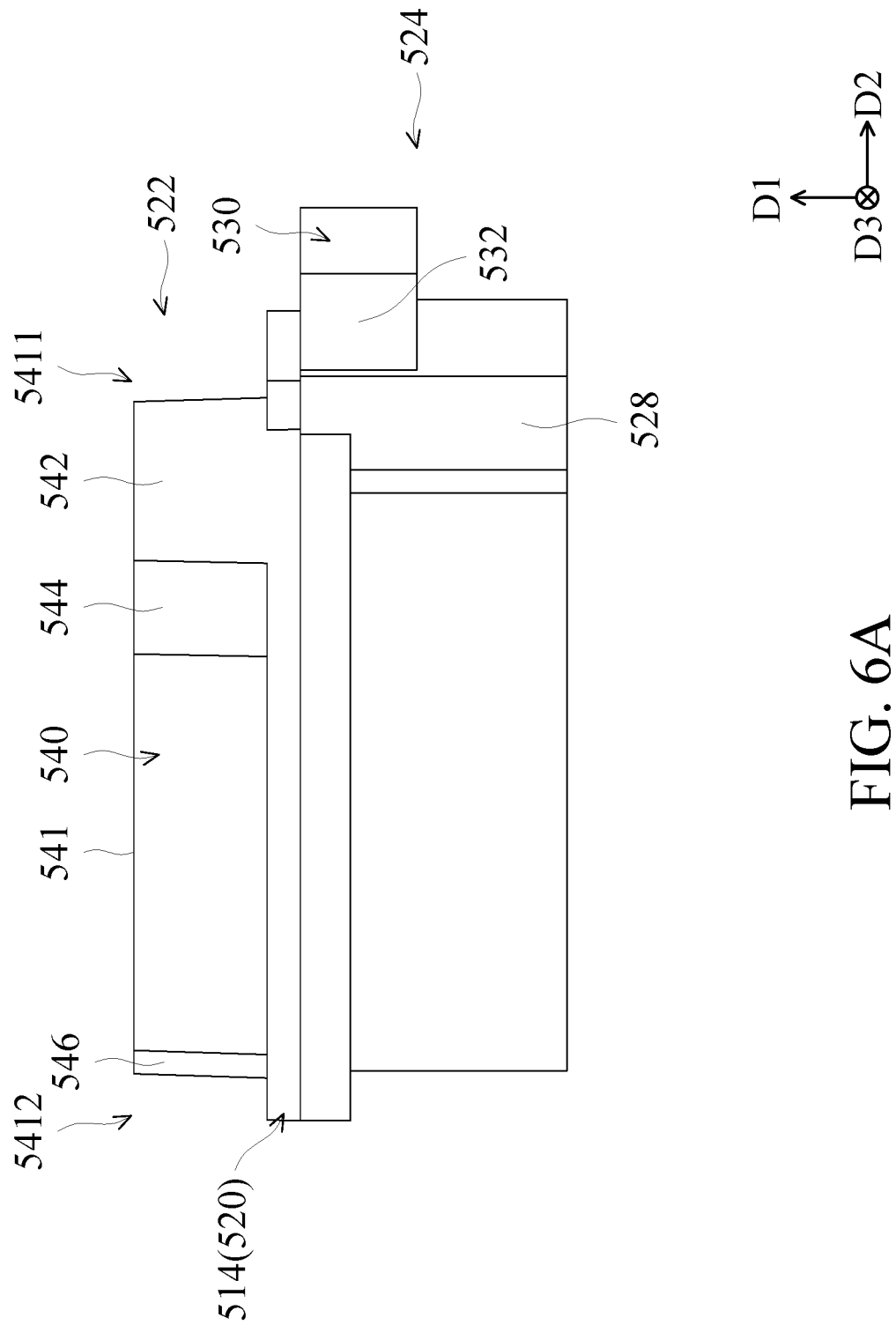
FIG. 6A is a side view of the second magnetic component according to some embodiments of the disclosure.
Figure 6B:
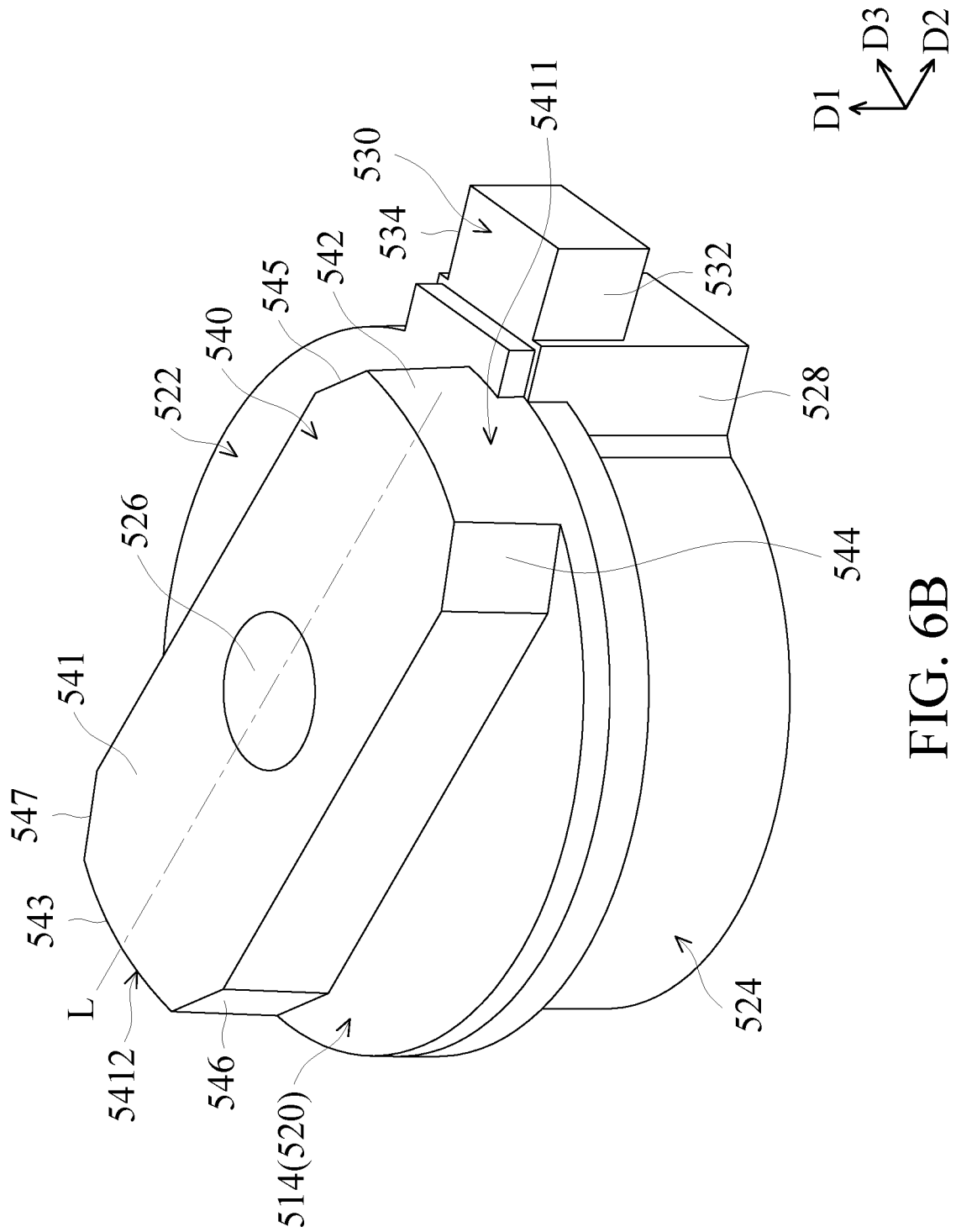
FIG. 6B is a perspective view of the second magnetic component according to some embodiments of the disclosure.

FIG. 6A is a side view of the second magnetic component 514. FIG. 6B is a perspective view of the second magnetic component 514. In this embodiment, the second magnetic component 514 and the second movable portion 520 are formed integrally as a single structure. It should be understood that in other embodiments, the second magnetic component 514 and the second movable portion 520 may be two separate components.

Referring to FIGS. 6A to 6B together, the second movable portion 520 includes an upper portion 522, a lower portion 524, a through hole 526, a connecting portion 528, a first stopper structure 530, and a first locking structure 540. The through hole 526 penetrates the upper portion 522 and the lower portion 524 of the second movable portion 520. The connecting portion 528 is located on the lower portion 524. The first stopper structure 530 is a structure protruding from the connecting portion 528.

It should be understood that in the present embodiment, the first stopper structure 530 is integrally formed on the lower portion 524 of the second movable portion 520, and the first locking structure 540 is integrally formed on the upper portion 522 of the movable portion 520. In other embodiments, the first stopper structure 530 and the first locking structure 540 may also be separate components.

Both the first stopper structure 530 and the first locking structure 540 have an elongated structure, and the extending directions of the elongated structures of the first stopper structure 530 and the extending directions of the elongated structures of the first locking structure 540 are not parallel. When viewed in any direction perpendicular to the first axis D1, the first stopper structure 530 and the first locking structure 540 do not overlap.

The first stopper structure 530 includes a first stopper surface 532 and a second stopper surface 534. The first stopper surface 532 and the second stopper surface 534 are parallel to each other, and face opposite directions. The first stopper surface 532 and the second stopper surface 534 correspond to a third stopper surface 552 and a fourth stopper surface 554 of the second stopper structure 550. The second stopper structure 550 corresponds to the first stopper structure 530. The details are described in relation to FIGS. 8A to 8B.

The first locking structure 540 provided on the second movable portion 520 includes a body 541, a first locking portion 542, a second locking portion 543, a first guiding portion 544, and a second guiding portion 545, a third guiding portion 546, and a fourth guiding portion 547.

The body 541 includes a first end 5411 and a second end 5412. The first end 5411 and the second end 5412 are respectively located at opposite ends of the body 541, wherein the first end 5411 is an end closer to the first stopper structure 530. The first locking portion 542 is located at the first end 5411, and has a curved structure. The second locking portion 543 is located at the second end 5412, and has a curved structure.

The first locking portion 542 is configured to correspond to a first abutting portion 561 of the second locking structure 560 disposed on the first movable portion 200. The second locking portion 543 is configured to correspond to a second abutting portion 562 of the second locking structure 560 of the first movable portion 200. The corresponding relationship between the first locking structure 540 and the second locking structure 560 is described in detail in relation to FIGS. 10A to 10E.

The first locking portion 542 is located between the first guiding portion 544 and the second guiding portion 545. The first guiding portion 544 and the second guiding portion 545 each form a discontinuous surface with the first locking portion 542. When viewed along the first axis D1, the first guiding portion 544 and the second guiding portion 545 are not parallel, and the included angle formed by extending along the surfaces of the first guiding portion 544 and the second guiding portion 545 may be less than 90 degrees or greater than 90 degrees.

When viewed along the first axis D1, the center formed by intersection of the surfaces extending along of the first guiding portion 544 and the second guiding portion 545 is located on the long axis L. The long axis L is perpendicular to the rotational axis of the second movable portion 520, which is parallel to the first axis D1.

Similar to the first locking portion 542, the second locking portion 543 is located between the third guiding portion 546 and the fourth guiding portion 547. The third guiding portion 546 and the fourth guiding portion 547 each form a discontinuous surface with the second locking portion 543.

When viewed along the first axis D1, the third guiding portion 546 and the fourth guiding portion 547 are not parallel, and the included angle formed by extending along the surfaces of the third guiding portion 546 and the fourth guiding portion 547 may be less than 90 degrees or greater than 90 degrees. When viewed along the first axis D1, the center form by intersection of the surfaces extending along of the first guiding portion 544 and the second guiding portion 545, and the center form by intersection of the surfaces extending along of the third guiding portion 546 and the fourth guiding portion 547, is arranged along the long axis L.

Figure 7:
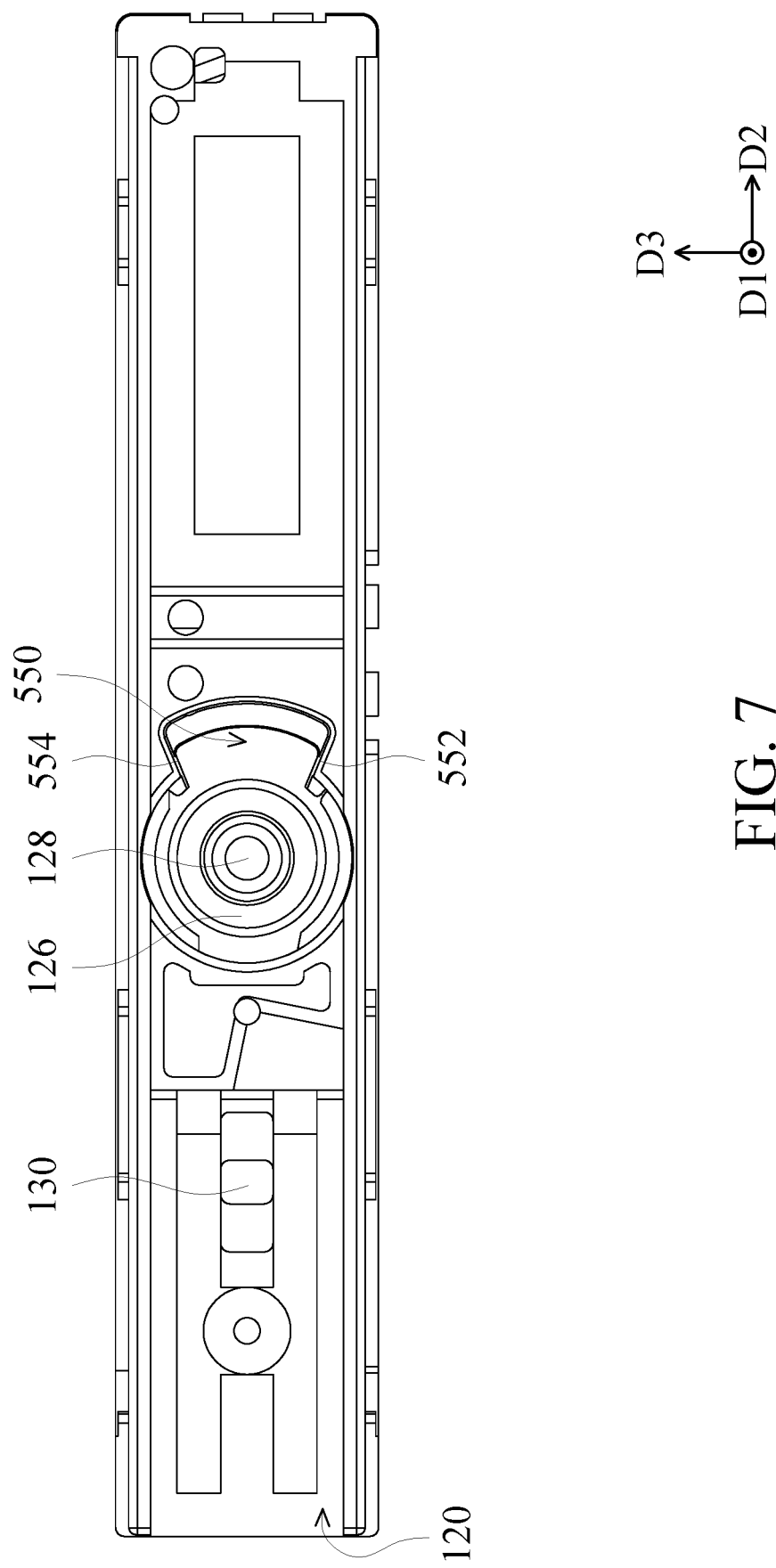
FIG. 7 is a top view of the base according to some embodiments of the present disclosure, wherein the accommodating space and the protruding post can be seen.

FIG. 7 is a top view of the base 120, wherein the accommodating space 126 for placing the second movable portion 520 (FIG. 6A) and the protruding post 128 for fixing the second movable portion 520 can be seen. In this embodiment, the second stopper structure 550 of the limiting assembly 500 is a sector portion in the accommodating space 126. The second stopper structure 550 has a third stopper surface 552 and a fourth stopper surface 554. The third stopper surface 552 and a fourth stopper surface 554 are not parallel.

Figure 8A:
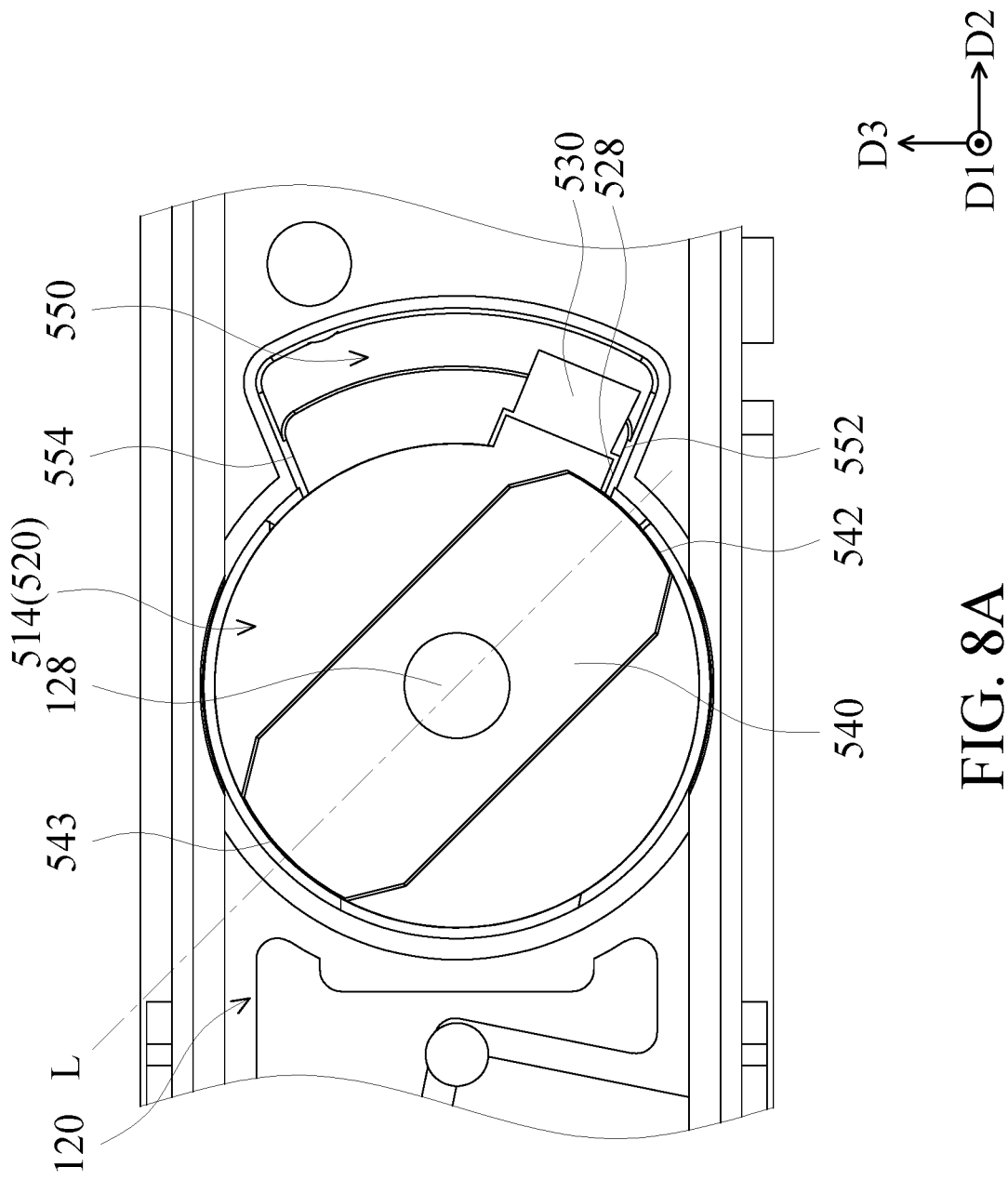
FIG. 8A is a top view of the base and the second movable portion in a locked position according to some embodiments of the disclosure.

FIG. 8A shows a top view of the base 120 and the second movable portion 520 in a locked position. When the second coil 512 (FIG. 4) does not receive any signal, the second driving assembly 510 generates a predetermined force to move the second movable portion 520 toward the third stopper surface 552, thereby causing part of the connecting portion 528 and the third stopper surface 552 to contact.

When the second movable portion 520 is in the locked position, the first movable portion 200 and the optical component 300 (FIG. 2) are not be able to move from the first position to the second position, or from the second position to the first position. The details are described in relation to FIGS. 10A to 10E.

Figure 8B:
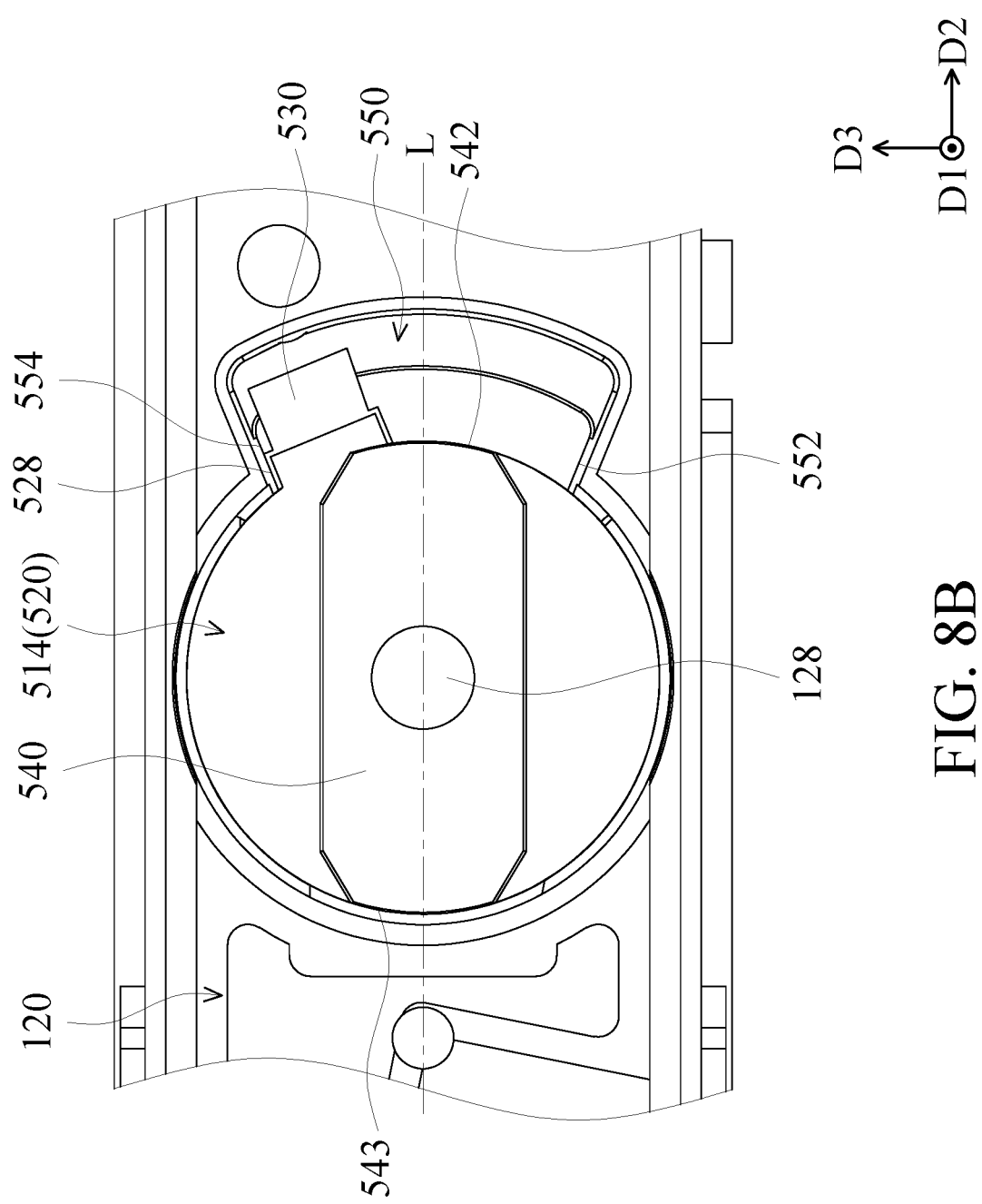
FIG. 8B is a top view of the base and the second movable portion in an open position according to some embodiments of the disclosure.

FIG. 8B shows a top view of the base 120 and the second movable portion 520 in an open position. When the second driving assembly 510 drives the second movable portion 520 from the locked position to the open position, the connecting portion 528 contacts the fourth stopper surface 554. When the second movable portion 520 is in the open position, the long axis L of the first locking structure 540 is be parallel to the second axis D2.

Referring to FIGS. 9A to 9C together, FIG. 9A shows a bottom view of the first movable portion 200. FIGS. 9B and 9C show perspective views of the first movable portion 200. The bump 220, the first protrusion 230, the second protrusion 240, and the groove 250 can be seen.

When viewed along the first axis D1, the structure of the first protrusion 230 and the structure of the second protrusion 240 have point symmetry. In other words, when the first protrusion 230 and the second protrusion 240 rotate 180 degrees around a fixed point P, the position of the first protrusion 230 after the rotation may coincide with the position of the second protrusion 240 before the rotation; the position of the second protrusion 240 after rotation may coincide with the position of the first protrusion 230 before the rotation. The groove 250 is used for disposing the first magnetic component 420 (FIG. 2).

The second locking structure 560 includes a first abutting portion 561, a second abutting portion 562, and an accommodating structure 563. The first abutting portion 561 and the second abutting portion 562 are respectively located on the first protrusion 230 and the second protrusion 240. The first abutting portion 561 corresponds to the first locking portion 542 (FIG. 6B), and the second abutting portion 562 corresponds to the second locking portion 543 (FIG. 6B). The details are described in relation to FIGS. 10A to 10E.

When viewed along the first axis D1, the arrangement direction of the first abutting portion 561 and the second abutting portion 562 is not parallel to the second axis D2. When viewed along the first axis D1, the arrangement direction of the first abutting portion 561 and the second abutting portion 562 is not parallel to the third axis D3. When viewed along the first axis D1, the first abutting portion 561 and the second abutting portion 562 are located at the same end of the first movable portion 200.

The accommodating structure 563 is a groove formed between the first protrusion 230 and the second protrusion 240 and having an elongated structure. The accommodating structure 563 corresponds to the body 541 of the first locking structure 540 (FIGS. 6A to 6B).

In this embodiment, the second locking structure 560 is disposed on the first protrusion 230 and the second protrusion 240 of the first movable portion 200. This configuration may achieve the miniaturization effect of the mechanism of the present invention. It should be understood that in other embodiments of the present disclosure, the second locking structure 560 may also be a separate component connected to the first movable portion 200.

Figure 10A:
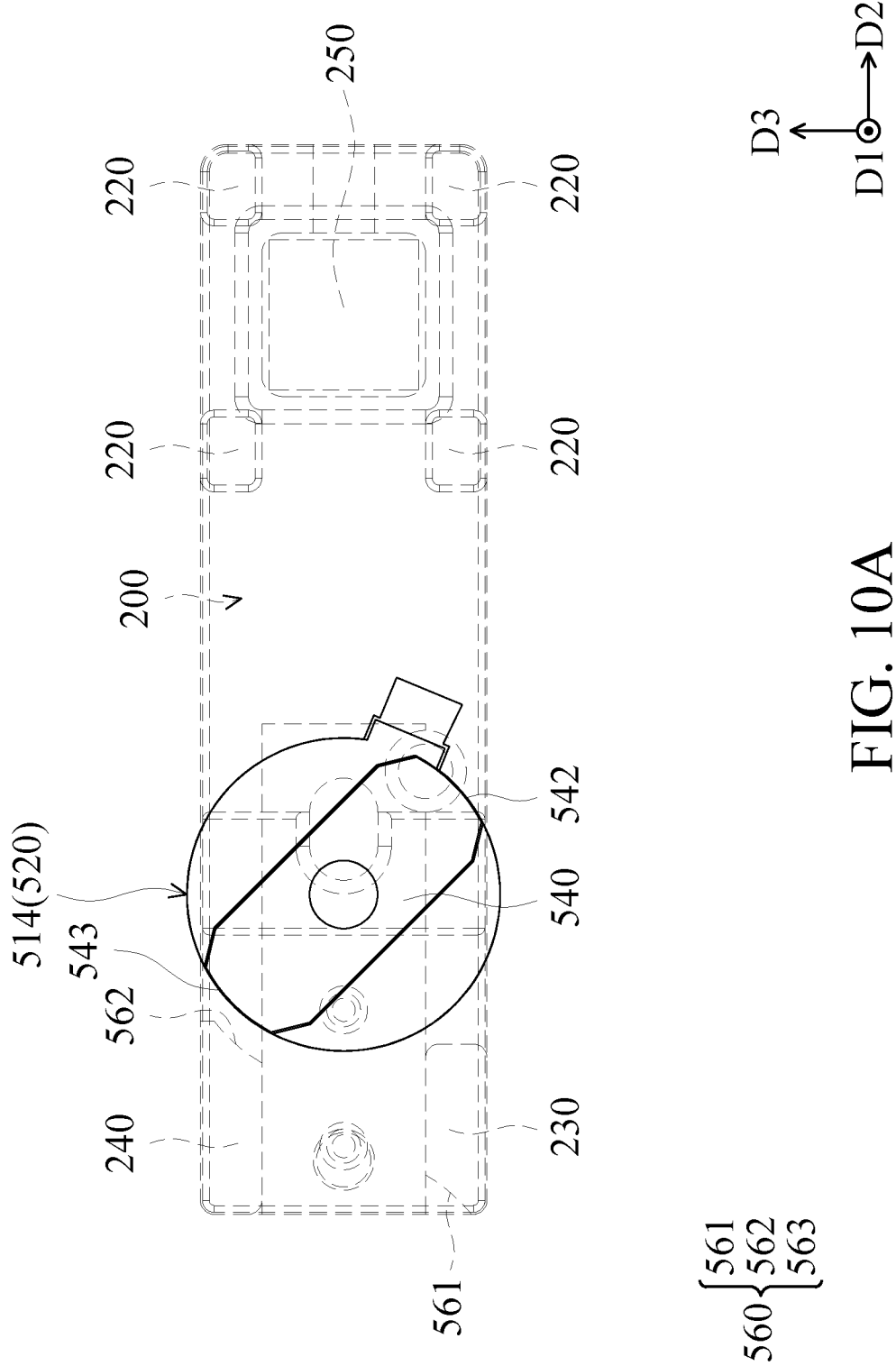
FIG. 10A is a top view of the first movable portion shown in dashed lines in the first position and the second movable portion in the locked position according to some embodiments of the present disclosure.

FIG. 10A shows a top view of the first movable portion 200 shown in dashed lines in the first position and the second movable portion 520 in the locked position. When the first movable portion 200 is in the first position, the shielding portion 320 (FIG. 3A) overlap the opening 112 (FIG. 3A) as shown in FIG. 3A. When the second movable portion 520 is in the locked position, the long axis L is not be parallel to the second axis D2 as shown in FIG. 8A, and the connecting portion 528 contacts the third stopper surface 552.

It can be seen in FIG. 10A that when the first movable portion 200 is in the first position and the second movable portion 520 is in the locked position, the second locking portion 542 of the first locking structure 540 and the second abutting portion 562 of the second locking structure 560 are not in contact.

The first movable portion 200 is moved toward the second position as shown in FIG. 3B when the optical component driving mechanism 10 is subjected to an impact force. Since the second movable portion 520 is in the locked position, the second abutting portion 562 of the second locking structure 560 corresponds to the second locking portion 543 of the first locking structure 540 by abutting against each other. Thus, the first movable portion 200 cannot move through the second movable portion 520. The details are described in relation to FIG. 10E.

Figure 10B:
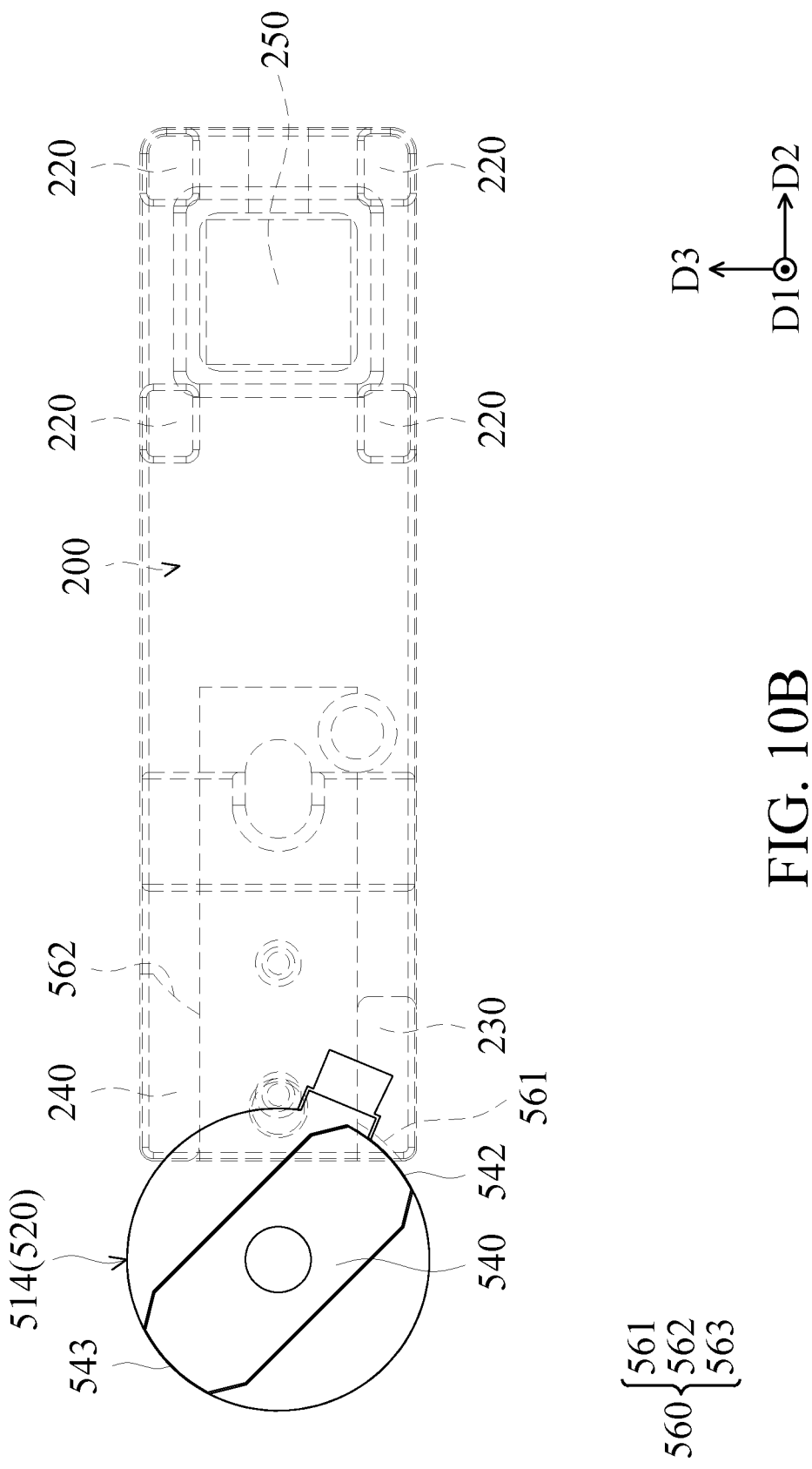
FIG. 10B is a top view of the first movable portion shown in dashed lines in the second position and the second movable portion in the locked position according to some embodiments of the present disclosure.

FIG. 10B shows a top view of the first movable portion 200 shown in dashed lines in the first position and the second movable portion 520 in the locked position. When the first movable portion 200 is in the second position, the first movable portion 200 is located in the base 120 close to the third side 13 as shown in FIG. 3B. When the second movable portion 520 is in the locked position, the long axis L is not be parallel to the second axis D2 as shown in FIG. 8A, and the connecting portion 528 and the third stopper surface 552 are in contact.

It can be seen in FIG. 10B that when the first movable portion 200 is in the second position and the second movable portion 520 is in the locked position, the first locking portion 542 of the first locking structure 540 and the second abutting portion 561 of the second locking structure 560 are not in contact.

The first movable portion 200 is moved toward the first position as shown in FIG. 3A when the optical component driving mechanism 10 is subjected to an impact force. Since the second movable portion 520 is in the locked position, the first abutting portion 561 of the second locking structure 560 corresponds to the first locking portion 542 of the first locking structure 540 by abutting against each other. Thus, the first movable portion 200 cannot move through the second movable portion 520. The details are described in relation to FIG. 10D.

Figure 10C:
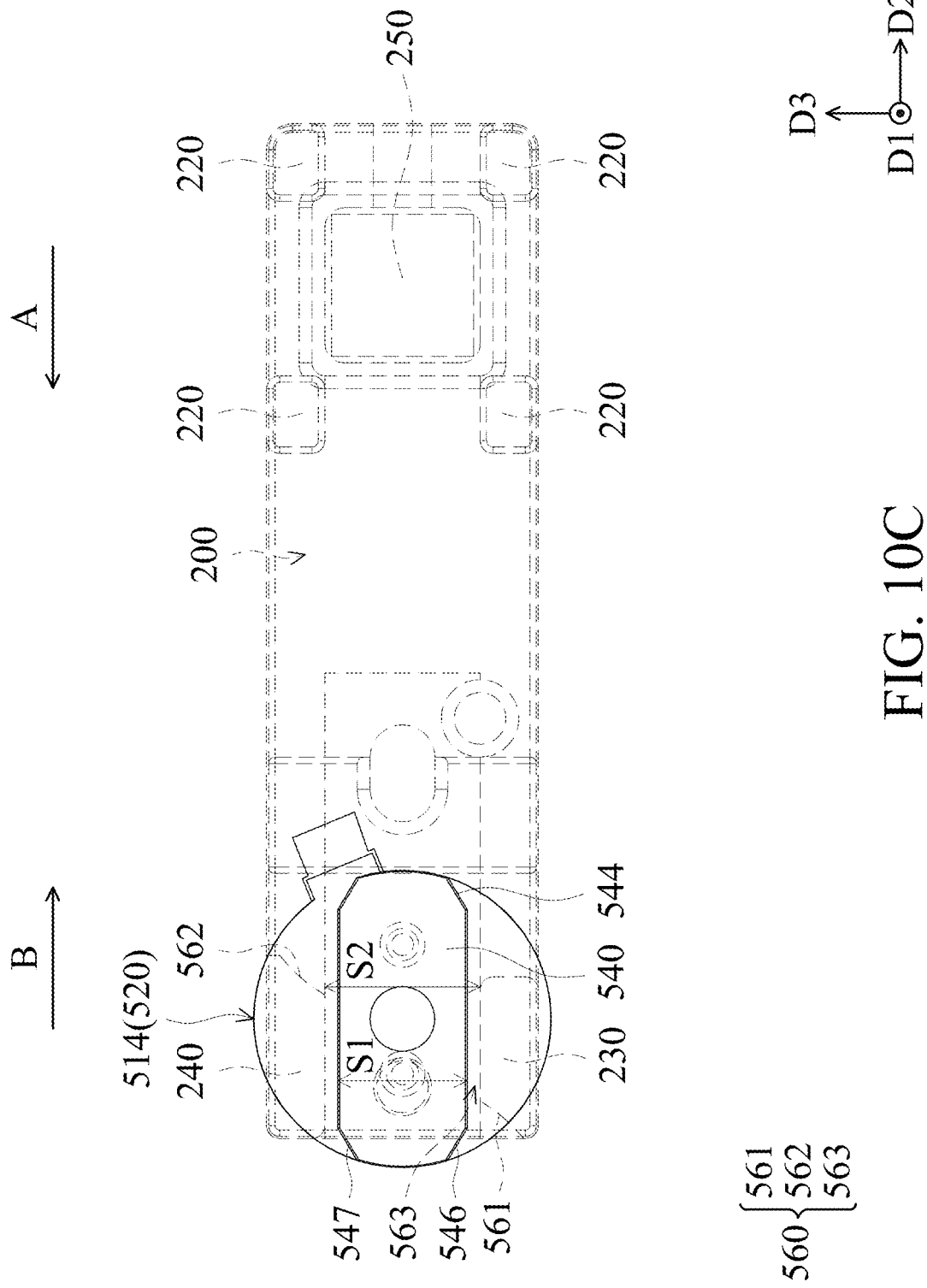
FIG. 10C is a top view of the first movable portion shown in dashed lines in a third position and the second movable portion in the open position according to some embodiments of the present disclosure.

FIG. 10C shows a top view of the first movable portion 200 shown in dashed lines in a third position and the second movable portion 520 in the open position. The third position is between the first position shown in FIG. 3A and the second position shown in FIG. 3B.

When the first movable portion 200 is in the third position and the second movable portion 520 is in the open position, the long axis L is parallel to the second axis D2 as shown in FIG. 8B. In the open position, the first locking structure 540 is located in the accommodating structure 563 formed between the first protrusion 230 and the second protrusion 240.

The second driving assembly 510 may drive the second movable portion 520 to move from the locked position to the open position. Then, the first movable portion 200 may be moved from the first position shown in FIG. 3A to the second position shown in FIG. 3B by the driving of the first driving assembly 400. Alternatively, the first movable portion 200 may be moved from the second position shown in FIG. 3B to the first position shown in FIG. 3A by the driving of the first driving assembly 400.

When the first locking structure 540 may move in the first direction A relative to the second locking structure 560, the third guiding portion 546 and the fourth guiding portion 547 are used to guide the second locking structure 560 to move in the first direction A relative to the first locking structure 540.

When the first locking structure 540 may move in the second direction B relative to the second locking structure 560, the first guiding portion 544 and the second guiding portion 545 are used to guide the second locking structure 560 to move relative to the first locking structure 540.

When the first movable portion 200 is in the third position and the second movable portion 520 is in the open position, the maximum size S1 of the first locking structure 540 on the third axis D3 is smaller than the maximum size S2 of the accommodating structure 563 on the third axis D3.

More specifically, the shortest distances from the first locking structure 540 to the first protrusion 230 and the second protrusion 240 are both at least 0.08 mm. In this embodiment, the shortest distances from the first locking structure 540 to the first protrusion 230 and the second protrusion 240 are each about 0.1 mm. Therefore, on the third axis D3, the difference between the maximum size of the first locking structure 540 and the maximum size of the accommodating structure 563 is at least 0.16 mm.

Figure 10D:
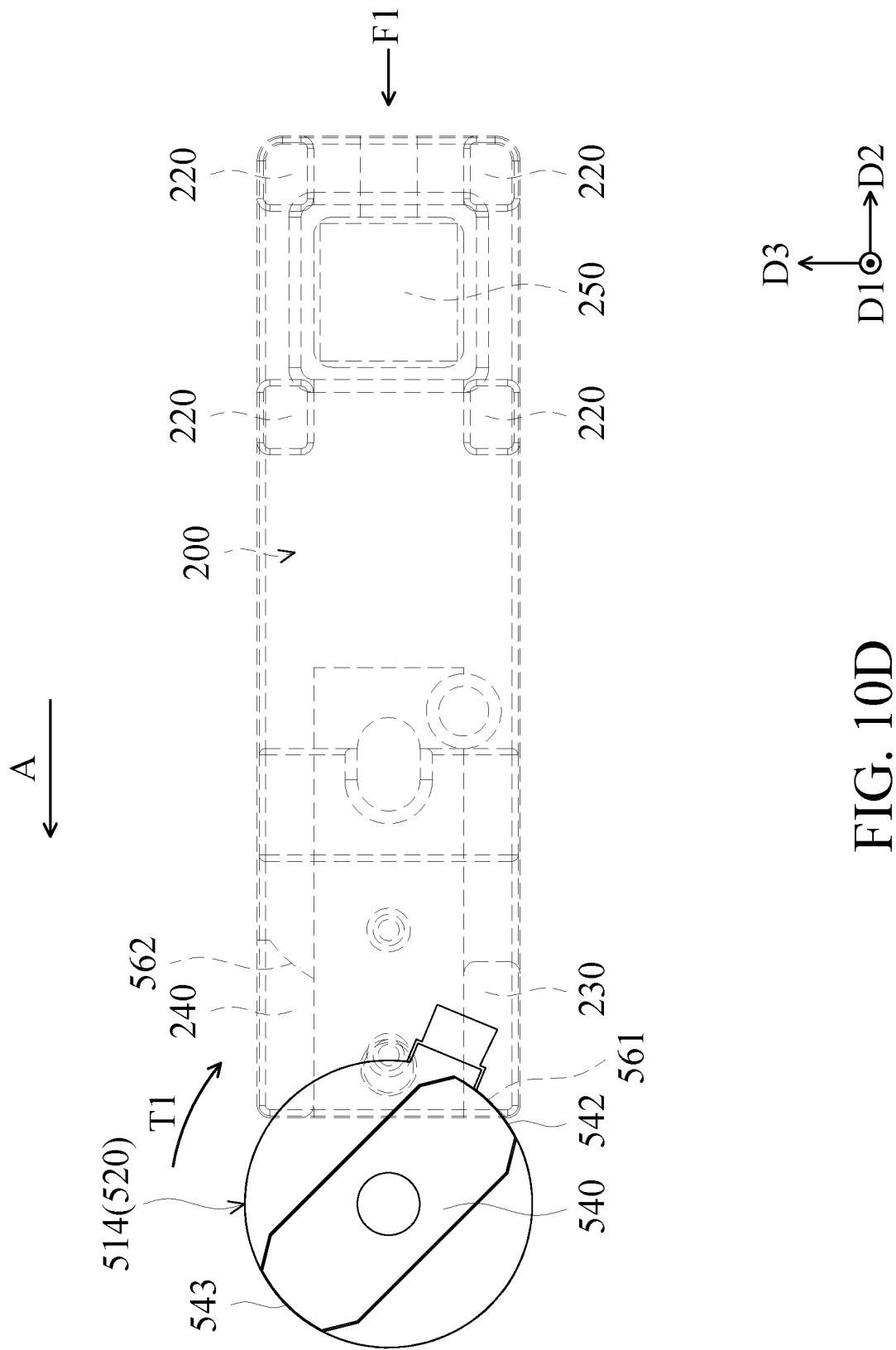
FIG. 10D is a top view of the first movable portion shown in dashed lines and the second movable portion according to some embodiments of the present disclosure, wherein the first movable portion is moved along a first direction from the second position due to a first impact force.

FIG. 10D shows a top view of the first movable portion 200 shown in dashed lines and the second movable portion 520, wherein the first movable portion 200 is moved from the second position along the first direction A due to a first impact force F1, which caused the first locking portion 542 contacting the first abutting portion 561.

Due to the impact force of the first abutting portion 561 against the first locking portion 542 in the locked position in the first direction A, the first movable portion 200 generates a first torque T1 to the second movable portion 520. The first torque T1 moves the first stopper surface 532 toward the third stopper surface 552 (FIG. 8A), caused the first stopper surface 532 contacting the third stopper surface 552.

Therefore, with the corresponding contact between the first stopper structure 530 and the second stopper structure 550 (FIG. 8A), and the corresponding contact between the first locking structure 540 and the second locking structure 560, the first movable portion 200 cannot move from the second position to the first position when the second movable portion 520 is in the locked position.

Figure 10E:
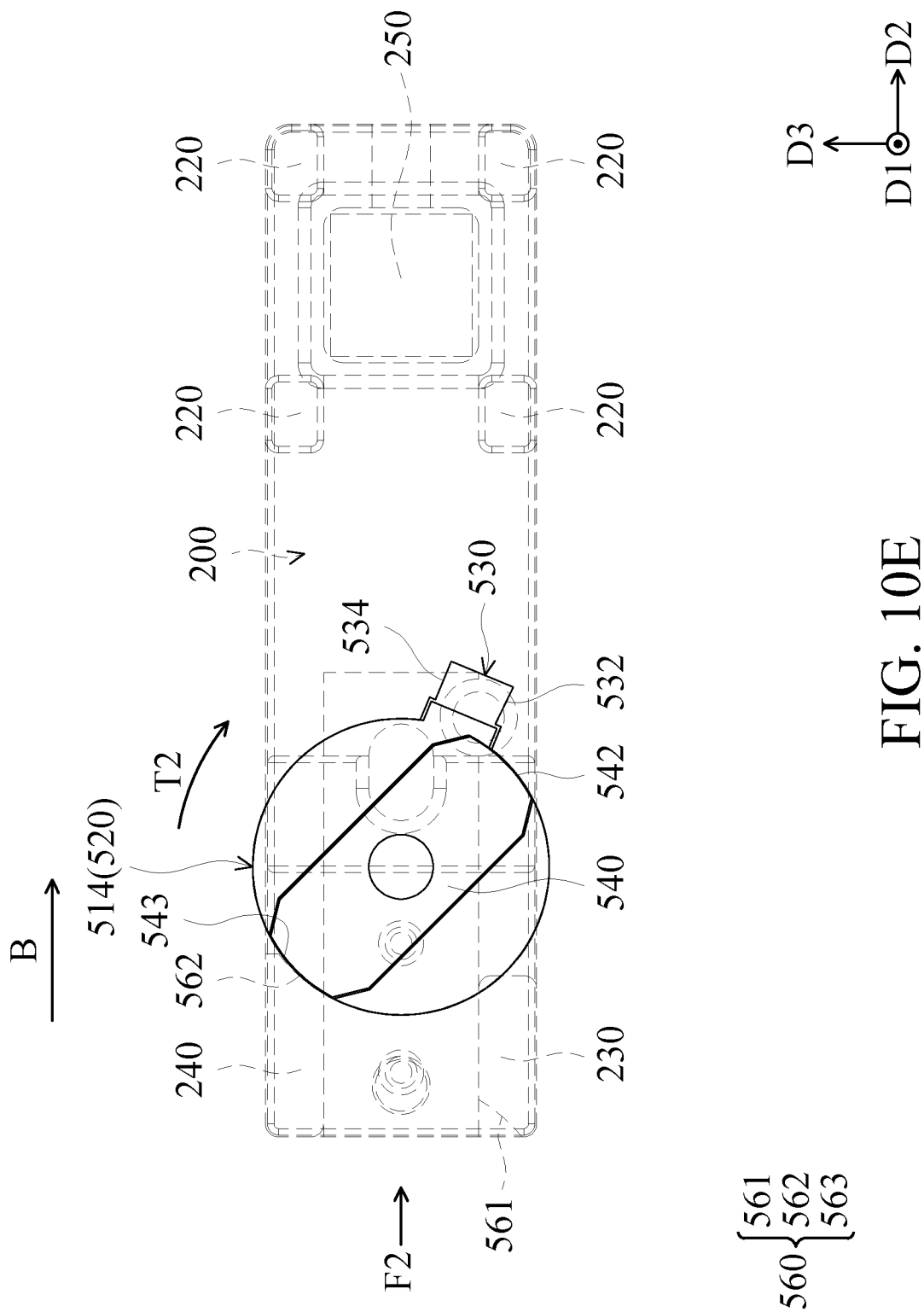
FIG. 10E is a top view of the first movable portion shown in dashed lines and the second movable portion according to some embodiments of the present disclosure, wherein the first movable portion is moved along a second direction from the first position due to a second impact force.

FIG. 10E shows a top view of the first movable portion 200 shown in dashed lines and the second movable portion 520, wherein the first movable portion 200 is moved from the first position along the second direction B due to a second impact force F2, which caused the second locking portion 543 contacting the second abutting portion 562.

Due to the impact force of the second abutting portion 562 against the second locking portion 543 in the locked position in the second direction B, the first movable portion 200 generates a second torque T2 to the second movable portion 520. The second torque T2 moves the first stopper surface 532 toward the third stopper surface 552 (FIG. 8A), caused the first stopper surface 532 contacting the third stopper surface 552.

Therefore, with the corresponding contact between the first stopper structure 530 and the second stopper structure 550 (FIG. 8A), and the corresponding contact between the first locking structure 540 and the second locking structure 560, the first movable portion 200 cannot move from the first position to the second position when the second movable portion 520 is in the locked position.

In the embodiment disclosed herein, the first locking structure 540 and the second locking structure 560 are fixedly disposed on the second movable portion 520 and the first movable portion 200, respectively. It should be understood that, in other embodiments, the first locking structure 540 and the second locking structure 560 may be fixedly disposed on the first movable portion 200 and the second movable portion 520, respectively.

Figure 11:
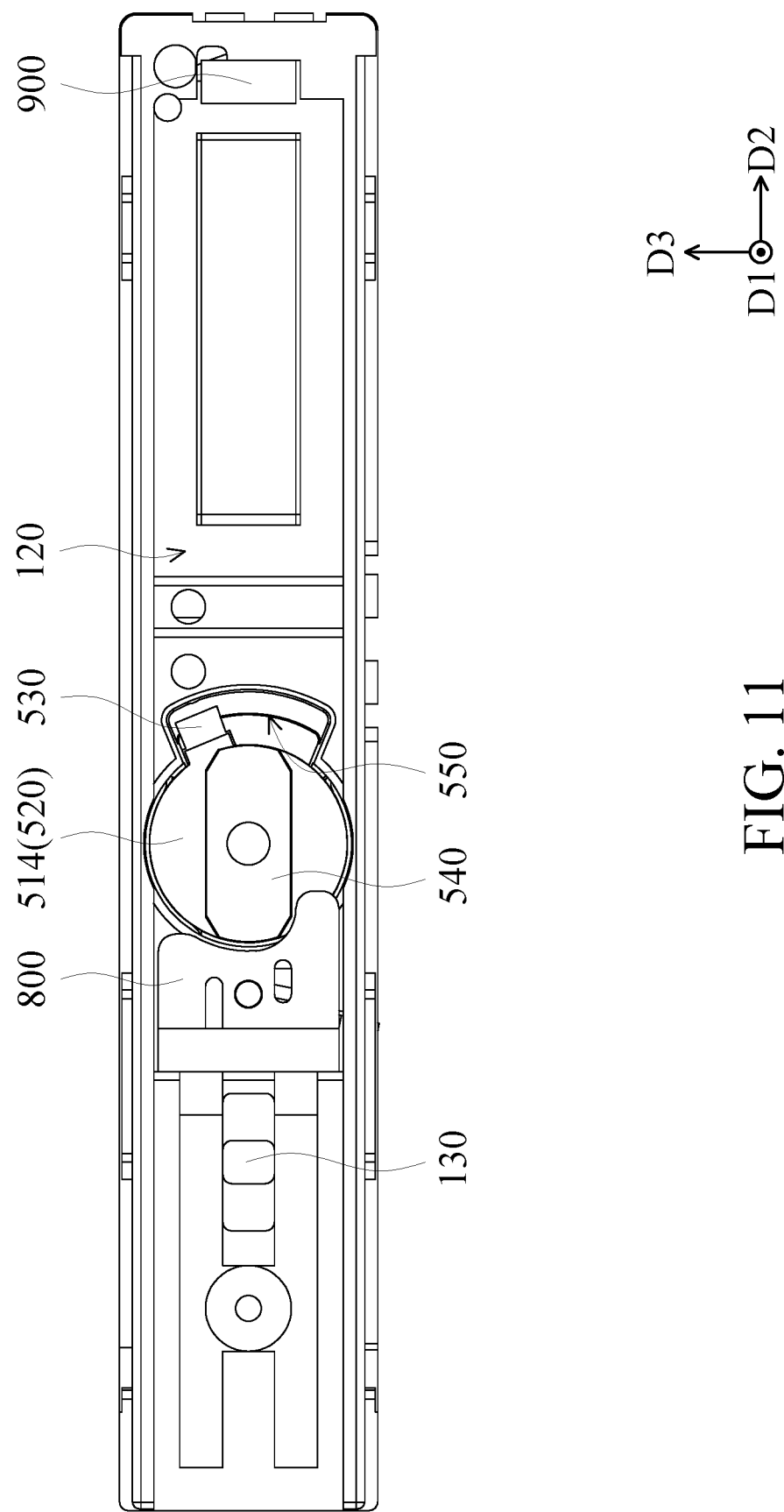
FIG. 11 is a top view of the base, the second magnetic component, the stopper component, and the buffer component according to some embodiments of the present disclosure.

FIG. 11 shows a top view of the base 120, the second magnetic component 514, the stopper component 800, and the buffer component 900. The stopper component 800 is configured to limit the range of motion of the second movable portion 520. The stopper component 800 has a metal material and a plate-shaped structure perpendicular to the first axis D1.

When viewed along the first axis D1, the stopper component 800 and the second magnetic component 514 at least partially overlap. The stopper component 800 prevents the second magnetic component 514 from moving along the first axis D1 when subjected to an impact force.

The present disclosure provides an optical component driving mechanism with a limiting assembly. Through the correspondence between the first locking structure and the second locking structure of the limiting assembly, and the correspondence between the first stopper structure and the second stopper structure of the limiting assembly, the optical component remain limited to the original position range even when the optical component is subjected to an impact force from different directions. As a result, the optical element that was originally open is prevented from being closed due to an impact force. Alternatively, the optical element that was originally closed is prevented from being opened due to an impact force. Therefore, user privacy and data security are protected.

The ordinal numbers in this specification and the claim, such as "first", "second", etc., do not have a sequential relationship between each other, and they are only used to distinguish two different components with the same name.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An optical component driving mechanism, comprising:
   a first movable portion connected to an optical component;
   a fixed portion having an opening, wherein the first movable portion is movable relative to the fixed portion;
   a first driving assembly configured to drive the first movable portion to perform a first movement relative to the fixed portion; and
   a limiting assembly limiting the range of motion of the first movable portion;
   wherein the optical component overlaps the opening when the first movable portion is located in a first position;
   wherein the limiting assembly comprises:
   a first locking structure corresponding to a second locking structure, wherein the first locking structure limits the first movable portion in the first position when the first driving assembly drives the first movable portion to move;
   a second movable portion, wherein the first locking structure is formed on the second movable portion; and
   a second driving assembly configured to drive the second movable portion to perform a second movement relative to the fixed portion;
   wherein the first movement is different from the second movement, and the second movement is rotation with a rotational axis as an axle center;
   wherein the first locking structure has an elongated structure extending along a long axis, the first locking structure and the second locking structure are fixedly disposed on the second movable portion and the first movable portion respectively, and the long axis is perpendicular to the rotational axis;
   wherein the rotational axis is parallel to a first axis; and the first movement is movement along a second axis, wherein the second axis is perpendicular to the first axis;
   wherein the first locking structure comprises:
   a body having an elongated structure extending along the long axis;
   a first locking portion having a curved structure, located in a first end of the body, and corresponding to a first abutting portion of the second locking structure, wherein the first abutting portion has a curved structure;
   a second locking portion having a curved structure, located in a second end of the body, and corresponding to a second abutting portion of the second locking structure, wherein the second abutting portion has a curved structure;
   a first guiding portion having a planar structure, wherein the first guiding portion is adjacent to the first locking portion, and the first guiding portion forms a discontinuous surface with the first locking portion, and the first guiding portion guides the second locking structure to move relative to the first locking structure when the first locking structure is movable relative to the second locking structure;
   a second guiding portion having a planar structure, wherein the second guiding portion is adjacent to the first locking portion, and the second guiding portion forms a discontinuous surface with the first locking portion, wherein the first locking portion is located between the first guiding portion and the second guiding portion, and the second guiding portion guides the second locking structure to move relative to the first locking structure when the first locking structure is movable relative to the second locking structure;
   a third guiding portion having a planar structure, wherein the third guiding portion is adjacent to the second locking portion, and the third guiding portion forms a discontinuous surface with the second locking portion, and the third guiding portion guides the second locking structure to move relative to the first locking structure when the first locking structure is movable relative to the second locking structure; and
   a fourth guiding portion having a planar structure, wherein the fourth guiding portion is adjacent to the second locking portion, and the fourth guiding portion forms a discontinuous surface with the second locking portion, wherein the second locking portion is located between the third guiding portion and the fourth guiding portion, and the fourth guiding portion guides the second locking structure to move relative to the first locking structure when the first locking structure is movable relative to the second locking structure.

2. The optical component driving mechanism as claimed in claim 1, wherein the included angle between the first guiding portion and the second guiding portion is less than 90 degrees when viewed along the first axis.

3. The optical component driving mechanism as claimed in claim 1, wherein the included angle between the first guiding portion and the second guiding portion is greater than 90 degrees when viewed along the first axis.

4. The optical component driving mechanism as claimed in claim 1, wherein the included angle between the first guiding portion and the long axis is less than 45 degrees when viewed along the first axis, and the center of the first guiding portion and the second guiding portion is located on the long axis, and the first guiding portion and the second guiding portion are not parallel when viewed along the first axis.

5. The optical component driving mechanism as claimed in claim 4, wherein the second locking structure has an accommodating structure, wherein the accommodating structure corresponds to the body, and the accommodating structure has an elongated structure.

6. The optical component driving mechanism as claimed in claim 5, wherein the limiting assembly further comprises a first stopper structure corresponding to a second stopper structure, limiting the range of motion of the second movable portion, wherein the first stopper structure has an elongated structure, and an extension direction of the first stopper structure is not parallel to the long axis, the first stopper structure does not overlap the first locking structure when viewed along any direction perpendicular to the first axis, and the first stopper structure comprises a first stopper surface and a second stopper surface, the second stopper structure comprises a third stopper surface and a fourth stopper surface, wherein the first stopper surface is parallel to the second stopper surface, and the first stopper surface and the second stopper surface face in opposite directions, the third stopper surface and the fourth stopper surface are not parallel.

7. The optical component driving mechanism as claimed in claim 6, wherein the long axis is parallel to an extension direction of the accommodating structure when the first locking structure is in an open position relative to the second locking structure; the long axis is parallel to the second axis when the first locking structure is in the open position relative to the second locking structure; on a third axis perpendicular to the first axis and the extension direction of the accommodating structure, the maximum size of the first locking structure is smaller than the maximum size of the accommodating structure when the first locking structure is in the open position relative to the second locking structure, and the first axis, the second axis, and the third axis are perpendicular to each other.

8. The optical component driving mechanism as claimed in claim 7, wherein the difference between the maximum size of the first locking structure and the maximum size of the accommodating structure is at least 0.16 mm on the third axis.

9. The optical component driving mechanism as claimed in claim 8, wherein the first movable portion has an elongated structure and extends along the second axis, the first abutting portion is located on a first protrusion of the first movable portion, and the second abutting portion is located on a second protrusion of the first movable portion, the structure of the first protrusion and the structure of the second protrusion have point symmetry when viewed along the first axis; the arrangement direction of the first abutting portion and the second abutting portion is not parallel to the second axis when viewed along the first axis; the arrangement direction of the first abutting portion and the second abutting portion is not parallel to the third axis when viewed along the first axis; the first abutting portion and the second abutting portion are located at the same end of the first movable portion when viewed along the first axis.

10. The optical component driving mechanism as claimed in claim 9, wherein the first driving assembly comprises:
a first magnetic component;
a first coil corresponding to the first magnetic component; and
a first magnetically permeable component having a magnetically permeable material and an elongated structure;
wherein the first coil is wound around the first magnetically permeable component.

11. The optical component driving mechanism as claimed in claim 10, wherein the second driving assembly comprises:
a second magnetic component, wherein the second magnetic component and the second movable portion have an integrally formed structure;
a second coil corresponding to the second magnetic component; and
a second magnetically permeable component having a magnetically permeable material and an elongated structure;
wherein the second coil is wound around the second magnetically permeable component.

12. The optical component driving mechanism as claimed in claim 11, wherein a winding axis of the first coil is not parallel to a winding axis of the second coil, an extension direction of the first magnetically permeable component is not parallel to an extension direction of the second magnetically permeable component, and the arrangement direction of the magnetic poles of the first magnetic component is perpendicular to the arrangement direction of the magnetic poles of the second magnetic component.

13. The optical component driving mechanism as claimed in claim 12, wherein when the second coil does not receive any signal, the second driving assembly generates a predetermined force to move the first stopper structure toward the third stopper surface; and when the first movable portion receives a first impact force, the first movable portion moves along a first direction, the first locking portion contacts the first abutting portion, and the first movable portion generates a first torque to the second movable portion, so that the first stopper structure moves toward the third stopper surface, and the first stopper structure is in direct contact with the third stopper surface; when the first movable portion receives a second impact force, the first movable portion moves along a second direction, and the second locking portion contacts the second abutting portion, and the first movable portion generates a second torque to the second movable portion, so that the first stopper structure moves toward the third stopper surface, and the first stopper structure is in direct contact with the third stopper surface; and the first direction and the second direction are in opposite directions.

14. The optical component driving mechanism as claimed in claim 13, wherein the optical component driving mechanism has a polygonal structure, the optical component driving mechanism has an elongated structure extending along the second axis when viewed along the first axis, and the optical component driving mechanism further comprises:
- a first side;
- a second side, perpendicular to the first side, wherein the length of the first side is smaller than the length of the second side, and the second side extends along the second axis; and
- a third side, parallel to the first side;
- wherein the shortest distance between the opening and the first side is different from the shortest distance between the opening and the third side.

15. The optical component driving mechanism as claimed in claim 14, wherein the fixed portion further comprises a base, the base has a non-metallic material and a first accommodating space and a second accommodating space, the first accommodating space accommodates the first driving assembly, and the second accommodating space accommodates the second driving assembly; the first coil is placed in the first accommodating space from a third direction; the first magnetic component is placed in the first accommodating space from a fourth direction; the second coil is placed in the second accommodating space from the third direction; the second magnetic component is placed in the second accommodating space from the fourth direction; wherein the third direction and the fourth direction are parallel to the first axis, and the third direction and the fourth direction are in opposite directions.

16. The optical component driving mechanism as claimed in claim 15, wherein the opening corresponds to a light traveling along an optical axis, and the optical axis is parallel to the first axis, the shortest distance between the opening and the first side is smaller than the shortest distance between the opening and the third side, the first driving assembly and the second driving assembly are arranged along the second axis, and the second driving assembly is located between the opening and the first driving assembly when viewed along the first axis.

17. The optical component driving mechanism as claimed in claim 16, further comprising:
- a first terminal, wherein the first driving assembly is electrically connected to an external circuit via the first terminal;
- a second terminal, wherein the second driving assembly is electrically connected to the external circuit via the second terminal; and
- a stopper component, limiting the range of motion of the second magnetic component, wherein the stopper component has a metal material and a plate-like structure perpendicular to the first axis;
- wherein the first driving assembly is located between the first terminal and the second terminal when viewed along the first axis, the stopper component and the second magnetic component at least partially overlap when viewed along the first axis.

* * * * *